(12) United States Patent
Broeng et al.

(10) Patent No.: US 7,590,323 B2
(45) Date of Patent: Sep. 15, 2009

(54) OPTICAL FIBRE WITH HIGH NUMERICAL APERTURE, METHOD OF ITS PRODUCTION, AND USE THEREOF

(75) Inventors: Jes Broeng, Kgs. Lyngby (DK); Anders Bjarklev, Roskilde (DK); Stig Eigil Barkou Libori, Soborg (DK); Jacob Riis Folkenberg, Kokkedal (DK); Guillaume Vienne, Copenhagen V (DK)

(73) Assignee: Crystal Fibre A/S, Birkerod (DK)

( * ) Notice: Subject to any disclaimer, the term of this patent is extended or adjusted under 35 U.S.C. 154(b) by 0 days.

(21) Appl. No.: 10/257,392

(22) PCT Filed: Aug. 30, 2002

(86) PCT No.: PCT/DK02/00568

§ 371 (c)(1),
(2), (4) Date: Mar. 11, 2003

(87) PCT Pub. No.: WO03/019257

PCT Pub. Date: Mar. 6, 2003

(65) Prior Publication Data

US 2003/0165313 A1 Sep. 4, 2003

(30) Foreign Application Priority Data

Aug. 30, 2001 (DK) ............... 2001 01286
Nov. 16, 2001 (DK) ............... 2001 01710
Dec. 6, 2001 (DK) ............... 2001 01815
Jan. 31, 2002 (DK) ............... 2002 00158
Feb. 22, 2002 (DK) ............... 2002 00285

(51) Int. Cl.
*G02B 6/20* (2006.01)

(52) U.S. Cl. .................. 385/125; 385/126; 389/341.1; 359/332

(58) Field of Classification Search ................. 385/125; 250/492.21
See application file for complete search history.

(56) References Cited

U.S. PATENT DOCUMENTS 5,495,541 A * 2/1996 Murray et al. ................. 385/33

(Continued)

FOREIGN PATENT DOCUMENTS

WO 99/00685 6/1998

(Continued)

OTHER PUBLICATIONS

Cladding-Mode-Resonances in Air-Silica Microstructure Optical Fibers, Eggleton et al, Journal of Lightwave Technology, vol. 18, No. 8, Aug. 2000, 1084-1100.

(Continued)

*Primary Examiner*—Frank G. Font
*Assistant Examiner*—Phillip A. Johnston
(74) *Attorney, Agent, or Firm*—Buchanan Ingersoll & Rooney PC

(57) ABSTRACT

An article comprising an optical fiber, the fiber comprising at least one core surrounded by a first outer cladding region, the first outer cladding region being surrounded by a second outer cladding region, the first outer cladding region in the cross-section comprising a number of first outer cladding features having a lower refractive index than any material surrounding the first outer cladding features, wherein for a plurality of said first outer cladding features, the minimum distance between two nearest neighboring first outer cladding features is smaller than 1.0 μm or smaller than an optical wavelength of light guided through the fiber when in use; a method of its production, and use thereof.

26 Claims, 31 Drawing Sheets

U.S. PATENT DOCUMENTS

| | | | | |
|---|---|---|---|---|
| 5,802,236 | A | * | 9/1998 | DiGiovanni et al. ........ 385/127 |
| 5,907,652 | A | * | 5/1999 | DiGiovanni et al. ........ 385/125 |
| 5,930,029 | A | * | 7/1999 | Mehuys ................. 359/341.33 |
| 5,937,134 | A | | 8/1999 | DiGiovanni |
| 5,949,941 | A | * | 9/1999 | DiGiovanni ................. 385/127 |
| 6,334,017 | B1 | * | 12/2001 | West .......................... 385/123 |
| 6,345,141 | B1 | * | 2/2002 | Grubb et al. ................ 385/127 |
| 6,418,258 | B1 | * | 7/2002 | Wang ......................... 385/125 |
| 6,658,183 | B1 | * | 12/2003 | Chandalia et al. ............. 385/48 |
| 6,687,445 | B2 | * | 2/2004 | Carter et al. ................ 385/127 |
| 6,792,188 | B2 | * | 9/2004 | Libori et al. ................ 385/125 |
| 6,813,429 | B2 | * | 11/2004 | Price et al. .................. 385/125 |
| 6,972,894 | B2 | * | 12/2005 | Bjarklev et al. ............. 359/332 |
| 2003/0190129 | A1 | * | 10/2003 | Bassett et al. ............... 385/125 |

FOREIGN PATENT DOCUMENTS

| | | |
|---|---|---|
| WO | 99/64904 | 3/1999 |
| WO | 99/64903 | 5/1999 |
| WO | 01/42829 | 12/2000 |

OTHER PUBLICATIONS

Clad-Pumped Yb: Er Codoped Fiber Lasers, Cheo et al, IEEE Photonics Technology Letters, vol. 13, No. 3, Mar. 2001, 188-190.

New Generation of Cladding Pumped Fibre Lasers and Amplifiers, Gradlain et al 2000 IEEE, 09.900 CWA3 (Invited) 172.

Designs for efficient high-energy high brightness Q-switched cladding-pumped Ytterbium-doped fiber lasers, Renaud et al, CMP1, CLEO 2000, 75-76.

Femtosecond fiber lasers hit power highs, Sucha et al, Laser Focus World, Aug. 2000, 133-136.

Optimized absorption in a chaotic double-clad fiber amplifier, Optics Letters vol. 26, No. 12/Jun. 15, 2001, 872-874.

Ctul-Nonlinearities in Optical Fibers, '12.45 CtuH8 Generation and Charac-terization of intense ultrashort tunable far-infrared (30-250µm) laser pulses Yan et al, 11.00 CTuIl (Invited), Novel device structures for fiber gratings, Eggleton, 2000 IEEE 80.

Ultrahigh power diode-pumped 1.5-µ m fiber amplifiers, Grubb et al, OFC '96 Technical Digest, 30-31.

Jacketed Air-Clad Cladding Pumped Ytterbium-doped Fibre Laser with Wide Tuning Range, J.K. Sahu et al, Electronics Letters, Aug. 30, 2001, vol. 37, No. 18, p. 1116-1117.

Novel Fiber Lasers and Applications, L.A. Zenteno et al, Optics & Photonics News, Mar. 2003, pp. 38-41.

* cited by examiner

OPTICAL FIBRE WITH HIGH NUMERICAL APERTURE, METHOD OF ITS PRODUCTION, AND USE THEREOF

1. BACKGROUND OF THE INVENTION

The present invention relates to electromagnetic waveguides, especially optical fibres having high numerical aperture, such as multimode optical fibres for high-power delivery and optical fibres, having rare-earth dopants in core and/or cladding region(s) and having waveguiding properties designed for high-power amplification and/or lasing, a method of its production, and use thereof.

THE TECHNICAL FIELD

Over the past few years, cladding pumped fibre lasers and amplifiers have become basic tools in research laboratories. In contrast to conventional optical fibres, which comprise a region of relatively high refractive index—the core—surrounded by a region of relatively low refractive index—the cladding, cladding pumped (or double-clad) fibres consist of a high-index core, surrounded by a region of intermediate refractive index, which in turn is surrounded by a region (typically polymer) of low refractive index that does play a role in light guiding. Double clad fibres for instance find use in high-power (cladding pumped) lasers and amplifiers. In such components, pump light from low brightness sources, such as diode arrays, is easily coupled into the inner cladding of double clad fibre due to the inner cladding's large cross sectional area and high numerical aperture. As the multimode pump light crosses the core, it is absorbed by the rare earth dopant, and in order to increase the overlap of the pump light with the core, the inner cladding is often made non-circular. It is important at this point to note that one of the problems of using circular inner-claddings is the possible excitation of so-called skew rays, which may be envisioned as optical rays of a spiral like shape, i.e., rays that do not overlap strongly with the core region, and, therefore, do not efficiently pump the rare-earth materials located in the core. The idea behind such double clad designs is described in recent textbooks (e.g., by Becker, Olsson, and Simpson, "Erbium-Doped Fiber Amplifiers, Fundamentals and Technology", Academic Press, 1999, ISBN 0-12-084590-3). However, as it is also described by Becker et al., the inner cladding is often a glass cladding surrounded by a low index polymer second cladding, which allows the inner cladding to become a guiding structure. Pump light is launched from the fibre end into the undoped cladding, propagating in a multimode fashion and interacting with the doped core as it travels along the fibre.

In an evaluation of high power fibre laser, Becker et al. describes that a rectangular shape for the multimode section (the inner cladding) is preferred for efficient coupling of radiation to the inner single-mode core, and matches well the geometric aspect ratio of diode laser pumps. The output of fibre lasers of this type is constrained to be single mode by the single mode fibre core, hence the name brightness converters (from large area multimode to single mode) is often given to these devices.

High-power fibre lasers are often used to replace solid-state lasers, since well-designed fibre lasers offer excellent thermal properties, reliability, simplicity, and compactness (as described by Hodzynski et al. in paper CWA49 of Technical Digest of CLEO'2001, May 6-11, 2001, Baltimore, Md., USA). Cladding pumped lasers and amplifiers find applications not only in telecommunications as high-power erbium-doped fibre amplifiers (EDFAs) and Raman amplifiers, but also in more traditional applications such as narrow band and single frequency pump sources for optical parametric generators and non-linear frequency converters. Also applications such as free space optical communication links, high peak power laser sources are required, and as described by Valley et al. in paper CWA51 of the Technical Digest of CLEO'2001, May 6-11, 2001, Baltimore, Md., USA, a potential candidate is the high-power, cladding pumped, Yb-doped fibre amplifier with a pulse-position-modulated seed oscillator. These principles will also be valid for fibres doped with other rare-earth ions, for operation at other wavelengths. An interesting possibility is described by Söderlund et al. in IEEE Photonics Technology Letters, Vol. 13, No. 1, January 2001, pp. 22-24, in which the amplified spontaneous emission (ASE) is described in cladding pumped long-wavelength band erbium-doped fibre amplifiers. It is here shown that with cladding pumping, directional effects of pumping are much reduced by increasing the cladding area. In effect, large cladding area results in more uniform pump power distribution along the fibre length, preventing build-up of short-wavelength gain and ASE power.

Recently a new type of optical fibre that is characterized by a so-called microstructure has been proposed. Optical fibres of this type (which are referred to by several names—as e.g. micro-structured fibres, photonic crystal fibre, holey fibre, and photonic bandgap fibres) have been described in a number of references, such as WO 99/64903, WO 99/64904, and Broeng et al (see Pure and Applied Optics, pp. 477-482, 1999) describing such fibres having claddings defining Photonic Band Gap (PBG) structures, and U.S. Pat. No. 5,802,236, Knight et al. (see J. Opt. Soc. Am. A, Vol. 15, No. 3, pp. 748-752, 1998), Monro et al. (see Optics Letters, Vol. 25 (4), p. 206-8, February 2000) defining fibres where the light is transmitted using modified Total Internal Reflection (TIR). This application covers fibres that are mainly guiding by TIR. Micro-structured fibres are known to exhibit waveguiding properties that are unattainable using conventional fibres.

In order to increase the amount of pump light that can be coupled into the fibre, D. J. DiGiovanni and R. S. Windeler has described a new air-clad fibre design in U.S. Pat. No. 5,907,652. DiGiovanni et al. discloses a cladding-pumped optical fibre structure that facilitates improved coupling of pump radiation into the fibre. Another aspect of the fibres disclosed by DiGiovanni et al. is to optically isolate the inner cladding from the outer structure in order to avoid recoating induced changes in optical properties of fibre Bragg gratings written in the fibre by ultra-violet (UV) light. The fibres according to the description of DiGiovanni et al. have increased numerical aperture (NA) resulting from provision of a cladding region having substantially lower effective refractive index than was found in the prior art. This was achieved by making the first outer cladding region substantially an air-clad region.

The application of microstructured fibres—or photonic crystal fibres—in connection with ytterbium-doping has been suggested and reported by W. J. Wadsworth et al. in IEE Electronics Letters, Vol. 36, pp. 1452-1453, 2000. Furthermore, the issue of high-power levels giving rise to undesired non-linearities or physical damage has been addressed very recently by W. J. Wadsworth et al. in paper CWC1 of the Technical Digest of CLEO'2001, May 6-11, 2001, Baltimore, Md., USA. The approach of W. J. Wadsworth et al. is to combine the single-mode and large-mode area properties of photonic crystal fibres with ytterbium codoping. Moreover, it is pointed out by Wadsworth et al. that care must be taken that any doped regions within the PCF do not themselves form waveguides. To avoid this the core of the presented ytterbium-doped fibre has been microstructured into 425 doped regions with diameters of less that 250 nm each—hereby forming an effective index medium with an area filling fraction of the doped glass of a few percent resulting in an effective step, which is insufficient for strong guidance. Wadsworth et al. furthermore mentions the potential of this technology to, scale to even larger cores, high output powers and for efficient cladding pumping from diode laser arrays using high-numerical-aperture double-clad microstructures.

In a recent publication by Doya, Legrand, and Mortessagne, (Optics Letters, Vol. 26, No. 12, Jun. 15, 2001, pp. 872-874) an optimised absorption of pump power is described for a fibre with a D-shaped inner cladding. Doya et al. uses a ray trajectory in the transverse section of the D-shaped fibre inner cladding to argue a well distributed pump distribution (avoiding the previously mentioned skew rays).

Russell et al. in WO 0142829 describe microstructured fibres for use as lasers for example as cladding pumped devices. The fibres describes by Russell et al. are characterized by a micro-structured inner cladding having a large (more than 10) number of low-index features that are arranged in a periodic manner. The inner cladding region of the fibres describes by Russell et al. are further characterized by a symmetric outer shape—as for example a circular or rectangular shape.

In order to achieve a high NA, DiGiovanni et al. in U.S. Pat. No. 5,907,652 describe that the first outer cladding region (also named the air-clad) should " . . . to a large extend be empty space, with a relatively small portion (typically <50%, preferably <25%) of the first outer cladding region being a support structure (the "web") that fixes the second outer cladding region relative to the inner cladding region." As shall be demonstrated under the detailed description of the present invention, the present inventors have, however, realised that it is not necessarily sufficient to have an air-clad region with a large air filling fraction for the fiber to exhibit a high NA of the inner cladding. In fact, the present inventors have realized that it is necessary to have the "web" designed in a specific manner that relates to the thickness of the threads of the "web" compared to the optical wavelength of light guided in the inner cladding in order to achieve a high NA.

It is a disadvantage of the fibres described by DiGiovanni et al. in U.S. Pat. No. 5,907,652 that the "web" has not been optimized for a high NA.

It is a further disadvantage of the fibres described by DiGiovanni et al. in U.S. Pat. No. 5,907,652 that the cross-section of the inner-cladding in the shown examples are substantially circular. This may lead to the appearance of skew rays of the pump, and result in non-optimal pumping of the core region.

It is a further disadvantage of the fibres described by DiGiovanni et al. in U.S. Pat. No. 5,907,652 that the inner cladding is not microstructured, i.e., control of the effective refractive index of the inner cladding has not been described, or moreover the use of specific placements of air-holes or voids in the inner cladding has not been explored.

It is a disadvantage of the Yb-codoped fibres reported by W. J. Wadsworth et al. in IEE Electronics Letters, Vol. 36, pp. 1452-1453, 2000 that they do not treat the issue of pump power distribution in multimode regions such as it is generally used in double clad fibres for high power applications.

It is a disadvantage of the D-shaped fibres described by Doya et al. that the advantages of microstructuring have not been used. It is a further disadvantage that the D-shaped fibre design require significant complexity in preform treatment (often involving long time-polishing), which may result in fibre glass defects.

It is a disadvantage of the fibres presented by Russell et al. that the shape of the inner cladding region is symmetric. It may be a further disadvantage that the fibres presented by Russell et al. have a large number of low-index features in the inner cladding region, as these will act to lower the NA of modes in the inner cladding compared to inner cladding features having none or a low number of low index features (less than 10). It may be a further disadvantage of the fibres presented by Russell et al. that the low-index features of the inner cladding region are periodically arranged. The present inventors have realised that non-periodic arrangement of features in the inner cladding region may provide a more efficient coupling between cladding modes and mode(s) guided in the fibre core.

2. DISCLOSURE OF THE INVENTION

Object of the Invention

It is the object of the present invention to provide a new class of optical waveguides, for which improved coupling into cladding pumped optical fibres may be obtained through optimal designs of micro-structured outer cladding regions that provide high NA for mode(s) of an inner cladding region.

It is a further object of the present invention to provide a new class of optical waveguides, in which improved efficiency of cladding pumped optical fibres may be obtained through optimal design of micro-structured inner cladding regions. Hereby, a more dynamical design of effective index—and a higher degree of flexibility concerning a given spatial pump distribution—is possible.

It is a further object of the present invention to provide new and improved cladding pumped devices in which the mode propagation properties of the photonic bandgap effect may be combined with a microstructured inner cladding for high power amplification and lasing It is still a further object of the present invention to provide improved fibre laser and amplifiers, which combines the feasibility of accurate spatial mode control of microstructured optical fibres with multimode pumping properties, and optimal placement of the active medium, e.g., the rare-earth-doped material.

Solution According to the Invention

The present inventors have realised that the use of low index cladding features with a relatively narrow area between neighbouring low-index features may be required in order to realise cladding pumped fibre amplifiers and lasers with a high NA of a fibre structure guiding a number of inner, cladding modes. The present inventors have realised an important relation between width of the above-mentioned areas and the optical wavelength of inner, cladding modes. The high NA of fibres, which may be obtained in fibres according to the present invention, provides advantages with respect to efficient coupling of light from laser sources into the fibres. The high NA may further provide advantages with respect to efficient transfer of energy from cladding modes in an inner cladding to mode(s) of the core.

According to a first aspect of the invention, there is provided an optical fiber comprising an optical fibre, the fibre comprising at least one core surrounded by a first outer cladding region, the first outer cladding region being surrounded by a second outer cladding region, the first outer cladding region in the cross-section comprising a number of first outer cladding features having a lower refractive index than any material surrounding the first outer cladding features, wherein for a plurality of said first outer cladding features, the minimum distance between two nearest neighbouring first outer cladding features is smaller than 1.0 µm or smaller than an optical wavelength of light guided through the fibre when in use. Here, the core may be surrounded by an outer cladding, the outer cladding comprising the first and the second outer cladding regions with the first outer cladding region arranged between the core and the second outer cladding region.

For the present invention, the minimum distance between two nearest neighbouring outer cladding features is meant to be the minimum distance between the outer boundaries of two nearest neighbouring cladding features.

It should be understood that when looking at a fibre of a given length, the cross-sectional dimensions of the fibre may vary along the length of the fibre. Thus, the present invention covers articles having a fibre, which in at least one cross-sectional area along the fibre length is given by one or more of the herein described embodiments. Here, the at least one cross-sectional area may represent an end surface of the fibre. It is also within a preferred embodiment that the at least one cross-sectional area represents a largest cross-sectional area along the fibre length.

According to a preferred embodiment of the invention, the fibre may be dimensioned so that the cross-sectional area of the fibre has a variation along the fibre length, which is not higher than 15% or not higher than 10%.

According to an embodiment of the present invention, the first outer cladding region in the cross section may have an inner diameter or inner cross-sectional dimension being larger than or equal to 15 µm. Here, the inner diameter or inner cross-sectional dimension of the first outer cladding region may be larger than or equal to 20 µm. Preferably, the inner diameter or inner cross-sectional dimension of the first outer cladding region is in the range from 80-125 µm or in the range from 125-350 µm.

The present invention also covers an embodiment in which the fibre comprises a number of cores with a plurality of said number of cores each being surrounded by a corresponding first outer cladding region, the cores and the first outer cladding regions being surrounded by the second outer cladding region, each of the first outer cladding regions in the cross-section comprising a number of first outer cladding features having a lower refractive index than any material surrounding the first outer cladding features, wherein for a plurality of the first outer cladding features of each of said first outer cladding regions, the minimum distance between two nearest neighbouring first outer cladding features is smaller than 1.0 µm or smaller than an optical wavelength of light guided through the fibre when in use.

Thus, according to a second aspect of the present invention, there is provided an article comprising an optical fibre, the fibre comprising a number of cores with a plurality of said number of cores each being surrounded by a corresponding first outer cladding region, the cores and the first outer cladding regions being surrounded by a second outer cladding region, each of the first outer cladding regions in the cross-section comprising a number of first outer cladding features having a lower refractive index than any material surrounding the first outer cladding features, wherein for a plurality of the first outer cladding features of each of said first outer cladding regions, the minimum distance between two nearest neighbouring first outer cladding features is smaller than 1.0 µm or smaller than an optical wavelength of light guided through the fibre when in use.

In a more specific aspect, the present invention provides an optical fibre for guiding light of at least one predetermined wavelength, the optical fiber having a longitudinal direction and a cross-section perpendicular thereto, the optical fibre comprising:

(a) at least one core region;

(b) a cladding region, said cladding region comprising:
    an outer cladding, said outer cladding comprising:
        (i) a first outer cladding region, said first outer cladding region comprising a first outer cladding background material and a plurality of first outer cladding features, said first outer cladding features having a lower refractive index than said first outer cladding background material, and surrounding said at least one core region, and
        (ii) at least one further outer cladding region, each of said at least one further outer cladding regions comprising a further outer cladding background material, and surrounding said first outer cladding region, wherein for a plurality of said first outer cladding features, two nearest neighbouring first outer cladding features have a minimum distance smaller than the wavelength of said light of at least one predetermined wavelength whereby an optical fibre having a high NA can be obtained.

In another aspect the present invention provides a method of producing an optical fibre for guiding light of at least one predetermined wavelength, the method comprising:

(a) providing a preform, said preform comprising:
    (i) at least one centre preform element for providing a core region of the optical fibre, said center preform element comprising at least one element selected from the group consisting of rods, tubes, or combinations thereof;
    (ii) a plurality of inner cladding preform elements for providing an inner cladding region of the optical fibre, said inner cladding preform elements comprising at least one element selected from the group consisting of rods, tubes, or combinations thereof;
    (iii) a plurality of first outer cladding preform elements for providing a first outer cladding region of the optical fibre, said first outer cladding preform elements comprising a plurality of elements selected from the group consisting of rods, tubes, or combinations thereof;
    (iv) optionally a plurality of further outer cladding preform elements for providing at least one further outer cladding region of the optical fibre, said further outer cladding preform elements comprising a plurality of elements selected from the group consisting of rods, tubes, or combinations thereof; and
    (v) an overcladding preform element for providing an outer diameter of the optical fibre, said overcladding preform element comprising an element in form of a tube; and (b) drawing said preform into a fibre;

wherein said first outer cladding preform elements are arranged to provide a minimum distance between two neighbouring first outer cladding elements of the optical fibre which is smaller than the wavelength of said light of at least one predetermined wavelength to be transmitted in the optical fibre.

Preferred embodiments are disclosed in the claims and further discussed hereinbelow.

For the embodiments of the present invention having a plurality of a number of cores each being surrounded by a corresponding first outer cladding region, it is preferred that each of said number of cores are surrounded by a first outer cladding region. It is also preferred that at least part of the plurality of cores each being surrounded by a corresponding first outer cladding region are arranged so that the first outer cladding regions of two neighbouring cores share a number of said first outer cladding features. Here, all of the plurality of cores each being surrounded by a first outer cladding region may be arranged so that the first outer cladding regions of two neighbouring cores share a number of said first outer cladding features.

For the embodiments of the present invention having a plurality of a number of cores each being surrounded by a corresponding first outer cladding region, it is preferred that a number or all of the first outer cladding regions in the cross section have an inner diameter or inner cross-sectional dimension being in the range of 5-100 µm. Here, a number or all of the first outer cladding regions in the cross section may have an inner diameter or inner cross-sectional dimension being in the range of 30-60 µm. It is also preferred that the plurality of cores each being surrounded by a first outer cladding region comprises at least 20 cores, such as at least 100 cores, such as at least 1000 cores, or such as at least 3000 cores.

The present invention also covers an embodiment in which the second outer cladding region is part of an outer cladding, which further comprises third and fourth outer cladding regions with the third outer cladding region arranged between the second and the fourth outer cladding region, the third outer cladding region in the cross-section comprising a number of third outer cladding features having a lower refractive index than any material surrounding the third outer cladding features, wherein for a plurality of said third outer cladding features, the minimum distance between two nearest neighbouring third outer cladding features is smaller than 1.0 µm or smaller than an optical wavelength of light guided through the fibre when in use.

When for a plurality of said first and/or third outer cladding features, the minimum distance between two nearest neighbouring outer cladding features is smaller than 1.0 µm, it is within a preferred embodiment that for a plurality of said first and/or third outer cladding features the minimum distance between two nearest neighbouring outer cladding features is smaller than 0.8 µm. Here, the minimum distance may be smaller than 0.5 µm, such as smaller than 0.4 µm, such as smaller than 0.3 µm, or such as smaller than 0.2 µm.

When for a plurality of said first outer cladding features the minimum distance between two nearest neighbouring first outer cladding features is smaller than an optical wavelength of light guided through the fibre when in use, it is preferred that for a plurality of said first outer cladding features, the minimum distance between two nearest neighbouring first outer cladding features is smaller than a shortest optical wavelength of light guided through the fibre. Also, when for a plurality of said third outer cladding features the minimum distance between two nearest neighbouring third outer cladding features is smaller than an optical wavelength of light guided through the fibre when in use, it is preferred that for a plurality of said third outer cladding features, the minimum distance between two nearest neighbouring third outer cladding features is smaller than a shortest optical wavelength of light guided through the fibre.

According to an embodiment of the invention, the core or cores may have a cross-sectional dimension larger than 25 µm. Here, the cross-sectional dimension may be larger than 50 µm, such as larger than 75 µm, or such as larger than 100 µm, thereby causing the fibre to guide light in multiple modes within the core.

The present invention further covers an embodiment in which one or more of the cores is/are surrounded by an inner cladding region having an effective refractive index with a lower value than the effective refractive index of the core being surrounded, said inner cladding regions being part of an inner cladding. Here, each inner cladding region may be surrounded by a corresponding first outer cladding region. It is preferred that the core or cores is/are contactingly surrounded by the inner cladding region or regions.

It is preferred that for one or more first outer cladding regions the first outer cladding features occupy a relatively large area of the first outer cladding region. Thus, the first outer cladding features may occupy 45% or more of the cross-sectional area of the one or more first outer cladding regions. It is preferred that for all the first outer cladding regions the first outer cladding features may occupy 45% or more of the cross-sectional area of the first outer cladding regions. It is also within preferred embodiments that, the first outer cladding features may occupy at least 50%, such as at least 60%, or such as at least 70% of the cross-sectional area of the first outer cladding region or regions. It is also within an embodiment of the invention that the third outer cladding features occupy 45% or more of the third outer cladding. Here, the third outer cladding features may occupy at least 50%, such as at least 60%, or such as at least 70% of the cross-sectional area of the third outer cladding.

The present inventors have also realised that the application of microstructured cladding regions allow for a much more flexible design and mode-control concerning the multimode pump waveguide, and moreover that accurate placement of one or a few elongated elements in the inner cladding region may provide an optimal distribution of the pump power along the fibre amplifier or laser. Thus, according to an embodiment of the invention, the inner cladding or one or more of the inner cladding regions in the cross-section may comprise one single inner cladding feature. Alternatively, the inner cladding or one or more of the inner cladding regions in the cross-section may comprise at least two inner cladding features, and it is preferred that the inner cladding or one or more of the inner cladding regions in the cross-section comprise(s) less than 10 inner cladding features. The inner cladding features may be placed in a non-periodic manner.

According to an embodiment of the present invention, the optical fibre may comprise at least two cores being surrounded by a common first outer cladding region. Here, the optical fibre may comprise even more cores, such as at least 7 cores, such as at least 19 cores, or such as at least 37 cores being surrounded by a common first outer cladding region. The optical fibre may also or alternatively comprise a plurality of cores in a substantially annular arrangement with the plurality of cores being surrounded by the common first outer cladding region. Preferably, the plurality of substantially annular arranged cores are arranged in an inner cladding so that a major part of the inner cladding are surrounded by the substantially annular arranged cores, said inner cladding having an effective refractive index with a lower value than the effective refractive index of each of said substantially annular arranged cores.

For a fibre having at least two cores surrounded by the common first outer cladding region, the distance between one set of two nearest neighbouring cores may be substantially identical to the distance between other sets of two nearest neighbouring cores. It is preferred that each of said cores being surrounded by a common first outer cladding region is surrounded by an inner cladding region having an effective refractive index with a lower value than the effective refractive index of the core being surrounded, said inner cladding regions being part of an inner cladding being surrounded by the common first outer cladding region. Also here, the inner cladding in the cross-section may comprise a number of inner cladding features, such as at least two inner cladding features, such as at least 10 inner cladding features. It is preferred that at least part of the inner cladding features are arranged so that a for an inner cladding region surrounding one of said cores, said inner cladding region comprises several inner cladding features. It is also preferred that the inner cladding features of an inner cladding region are periodically arranged.

The present invention also covers an embodiment in which the optical fibre comprises a core being surrounded by an inner cladding having a number of inner cladding features being periodically distributed in two dimensions within said inner cladding, said inner cladding being surrounded by a first outer cladding region. It is preferred that the core comprises a core feature having a lower refractive index than the refractive index of the core material surrounding the core feature. It is also preferred that the periodically arrangement of the inner cladding features comprises at least 4 or 5 periods in a radial direction from the centre of the inner cladding.

The first and/or third outer cladding features may be placed in a periodic or non-periodic manner. However, it is preferred that first and/or third outer cladding features are placed in a non-circular symmetric manner. It is also within an embodiment of the invention that the first outer cladding region in the cross section has a substantially hexagonal like shape.

The first outer cladding features may be of about equal size, but the invention also covers embodiments in which first outer cladding features of different size are present.

It is preferred that the first and/or third outer cladding features and/or the inner cladding features are voids, and it is preferred that the first and/or third outer cladding features and/or the inner cladding features are filled with vacuum, air, a gas, a liquid or a polymer or a combination thereof. Thus, according to an embodiment of the invention, the first and/or third cladding features may be voids filled with air.

For embodiments having an inner cladding with core(s) being surrounded by an inner cladding or an inner cladding region, it is preferred that the core(s) has/have a cross-sectional dimension smaller than 10 □m. This may adapt the fibre to guide light in the core in a single mode. It is preferred that the core(s) comprise(s) at least one member of the group consisting of Ge, Al, P, Sn and B. However, the invention also covers embodiments in which the core(s) comprise(s) at least one rare earth, such as Er, Yb, Nd, La, Ho, Dy and/or Tm.

It is also within embodiments of the present invention that the fibre may have a long period grating or a fibre Bragg grating along at least a part of the fibre length.

It should be understood that different materials may be used for producing the fibre of the invention. Here, the fibre may comprise a background material being silica, chalcogenide, or another type of glass. It is also within the invention that the fibre may comprise a background material being polymer.

The present inventors have realised how the flexible design of microstructured optical fibres may be used for enhanced coupling efficiency for a pump light source (e.g., a semiconductor laser array), and how such designs may be readily fabricated using a preform fabrication technique that ensures a detailed control of the microstructured elements.

One of the fundamental problems to be solved by the invention is to obtain a better transversal and longitudinal pump power distribution in fibre lasers and amplifiers by optimal combinations of microstructured elements in the inner cladding and an improved mode control of signal and pump modes in cladding pumped fibres through microstructuring of the outer cladding.

Thus, for embodiments of the invention comprising an inner cladding, the article of the invention may be a cladding pumped fibre laser or amplifier. Here, the article may be a cladding pumped fibre laser or amplifier comprising a pump radiation source and a length of said optical fibre. Thus, when the minimum distance between two nearest neighbouring outer cladding features is smaller than a shortest optical wavelength, the shortest optical wavelength may be determined by the wavelength of said pump radiation source.

It is also within an embodiment of the invention that the optical fibre in the cross-section has a non-uniform shape of the inner cladding region along the fibre length.

According to an embodiment of the invention, the first and/or third outer cladding features may be periodically distributed. Hereby, the fibre may exhibit photonic bandgap effects, which may confine cladding modes in the core and/or in the inner cladding region.

It should be understood that for fibres having an inner cladding, the inner cladding region may act as a reservoir for light generated in the core. For fibres having an inner cladding, it is also within the invention that the optical fibre may comprise at least two cores for high power broadband amplification. The optical fibres of the present invention having an inner cladding may be optically pumped bi-directionally.

For fibres having inner cladding features, the fibre core material may be the same as the background material of the inner cladding region.

The present invention also covers embodiments wherein, for a majority or all of said first outer cladding features, the minimum distance between two nearest neighbouring outer cladding features is smaller than 1.0 □m. Here, for a majority or all of said first outer cladding features, the minimum distance between two nearest neighbouring outer cladding features may be smaller than 0.8 µm, such as smaller than 0.5 µm, such as smaller than 0.4 µm, such as smaller than 0.3 µm, or such as smaller than 0.2 µm.

Furthermore, the present invention also covers embodiments wherein, for a majority or all of said first outer cladding features, the minimum distance between two nearest neighbouring outer cladding features is smaller than an optical wavelength of light guided through the fibre when in use. Here, the optical wavelength may be a shortest optical wavelength of light guided through the fibre when in use.

Similarly, the present invention also covers embodiments wherein, for a majority or all of said third outer cladding features, the minimum distance between two nearest neighbouring outer cladding features is smaller than 1.0 µm. Here, for a majority or all of said third outer cladding features, the minimum distance between two nearest neighbouring outer cladding features may be smaller than 0.8 µm, such as smaller than 0.5 µm, such as smaller than 0.4 µm, such as smaller than 0.3 µm, or such as smaller than 0.2 µm. Furthermore, the present invention also covers embodiments wherein, for a majority or all of said third outer cladding features, the minimum distance between two nearest neighbouring outer cladding features is smaller than an optical wavelength of light guided through the fibre when in use. Here, the optical wavelength may be a shortest optical wavelength of light guided through the fibre when in use.

It should be understood that it is within a preferred embodiment of the invention that the outer cladding has an effective refractive no with a value lower than the effective refractive index of the core or any of the cores. It is also preferred that the outer cladding has an effective refractive index no, with a value lower that the effective refractive index of the inner cladding or inner cladding regions. Here, the effective refractive index of the inner cladding or inner cladding regions should be lower than the effective refractive index of the core or any of the cores.

According to an embodiment of the invention the second outer cladding region may be made of a homogeneous material.

For the first outer cladding features it is within an embodiment of the invention that the largest cross-sectional dimension are equal to or below 10 µm. Here, the largest cross-sectional dimension of the first outer cladding features may be equal to or below 3 µm.

For fibres according to the present invention having an inner cladding, it is within an embodiment of the invention that the inner cladding comprises a background material and a plurality of features, said features having a refractive index being higher and/or lower than the refractive index of the background material of the inner cladding. Here, the inner features may be substantially periodically arranged within two dimensions, or the inner features may be radial periodically arranged. It is preferred that the inner cladding features have a lower index than the refractive index of the background material, and the inner cladding features may be voids. The inner cladding features may be filled with vacuum, air, a gas, a liquid or a polymer or a combination thereof. When the inner cladding features have a lower index than the refractive index of the inner cladding background material, the inner cladding features may have a cross-sectional diameter or dimension in the range of 0.3-0.6 times or 0.3-0.5 times a centre-to-centre spacing between neighbouring inner cladding features. Here, the centre-to-centre spacing between neighbouring inner cladding features may be an average centre-to-centre spacing. The centre-to-centre spacing may be larger than 5 µm, such as in the range of 8-12 µm, or such as about 10 m. It is also within one or more embodiments of the invention that the core comprises one or more dopants for raising or lowering the refractive index above the refractive index of the background material of the inner cladding. The outer diameter of the inner cladding may be within the range from 60-400 µm, or within the range from 200-400 µm.

The present invention furthermore covers embodiments wherein the optical fibre has a length with a first end and a second end, and wherein the cross-sectional area of the first outer cladding features in the first end are larger than any cross-sectional area of first outer cladding features in the second end. Here, the second end may comprise no first outer cladding features, or the first outer cladding features may be fully collapsed in the second end.

Similarly, the present invention covers embodiments wherein the optical fibre has a length with a first end and a second end, and wherein the cross-sectional area of the third outer cladding features in the first end are larger than any cross-sectional area of third outer cladding features in the second end. Also here, the second end may comprise no third outer cladding features, or the third outer cladding features may be fully collapsed in the second end.

It should be understood that according to the present invention, the first outer cladding features may be elongate features extending in a fibre axial direction. Similarly, the third outer cladding features may be elongate features extending in a fibre axial direction, and also the inner cladding features may be elongate features extending in a fibre axial direction.

For fibres having an inner cladding it is within an embodiment of the present invention that the background material surrounding the first outer cladding features or the bridging material fulfilling the area between neighbouring first outer cladding features has a lower refractive index than the refractive index of the background material of the inner cladding.

It is also within the present invention that the article according to one or more embodiments of the invention is an endoscope.

It is to be understood that both the foregoing general description and the following detailed description are merely exemplary of the invention, and are intended to provide an overview or framework for understanding the nature and character of the invention as it is claimed. The accompanying figures are included to provide a further understanding of the invention, and are incorporated in and constitute a part of the invention. The invention is not limited to the described examples. The figures illustrate various features and embodiments of the invention, and together with the description serve to explain the principles and operation of the invention. Where indicated, the figures are used to describe prior art.

DEFINITION OF EXPRESSIONS AND TERMS

The term "article comprising an optical fiber" is intended to be interpreted broadly. For example it includes the optical fiber itself, e.g. an optical fiber coated with a fiber coating; an optical fiber product comprising the optical fiber in e.g. cabling; an optical fiber product comprising the optical fiber as an optical component; or an optical communication system or parts thereof comprising the optical fibre.

For micro-structures, a directly measurable quantity is the so-called "filling fraction" that is the volume of disposed features in a micro-structure relative to the total volume of a micro-structure. For fibres that are invariant in the axial fibre direction, the filling fraction may be determined from direct inspection of the fibre cross-section.

In this application we distinguish between "refractive index", "geometrical index" and "effective index". The refractive index is the conventional refractive index of a homogeneous material. The geometrical index of a structure is the geometrically weighted refractive index of the structure. As an example, a structure consisting of 40% air (refractive index=1.0) and 60% silica (refractive index≈1.45) has a geometrical index of $0.4 \times 1.0 + 0.6 \times 1.45 = 1.27$. The procedure of determining the effective refractive index, which for short is referred to as the effective index, of a given microstructure at a given wavelength is well-known to those skilled in the art (see e.g., Joannopoulos et al., "Photonic Crystals", Princeton University Press, 1995 or Broeng et al., Optical Fiber Technology, Vol. 5, pp. 305-330, 1999).

Usually, a numerical method capable of solving Maxwell's equation on full vectorial form is required for accurate determination of the effective indices of microstructures. The present invention makes use of employing such a method that has been well-documented in the literature (see previous Joannopoulos-reference). In the long-wavelength regime, the effective index is roughly identical to the weighted average of the refractive indices of the constituents of the material, that is, the effective index is close to the geometrical index in this wavelength regime. Naturally, for a homogeneous medium, the effective refractive index is identical to the refractive index.

3. BRIEF DESCRIPTION OF THE DRAWINGS

The functionality and additional features of the invention will become clearer upon consideration of the different embodiments now to be described in detail in connection with the accompanying drawings. In the figures.

Figure 8:
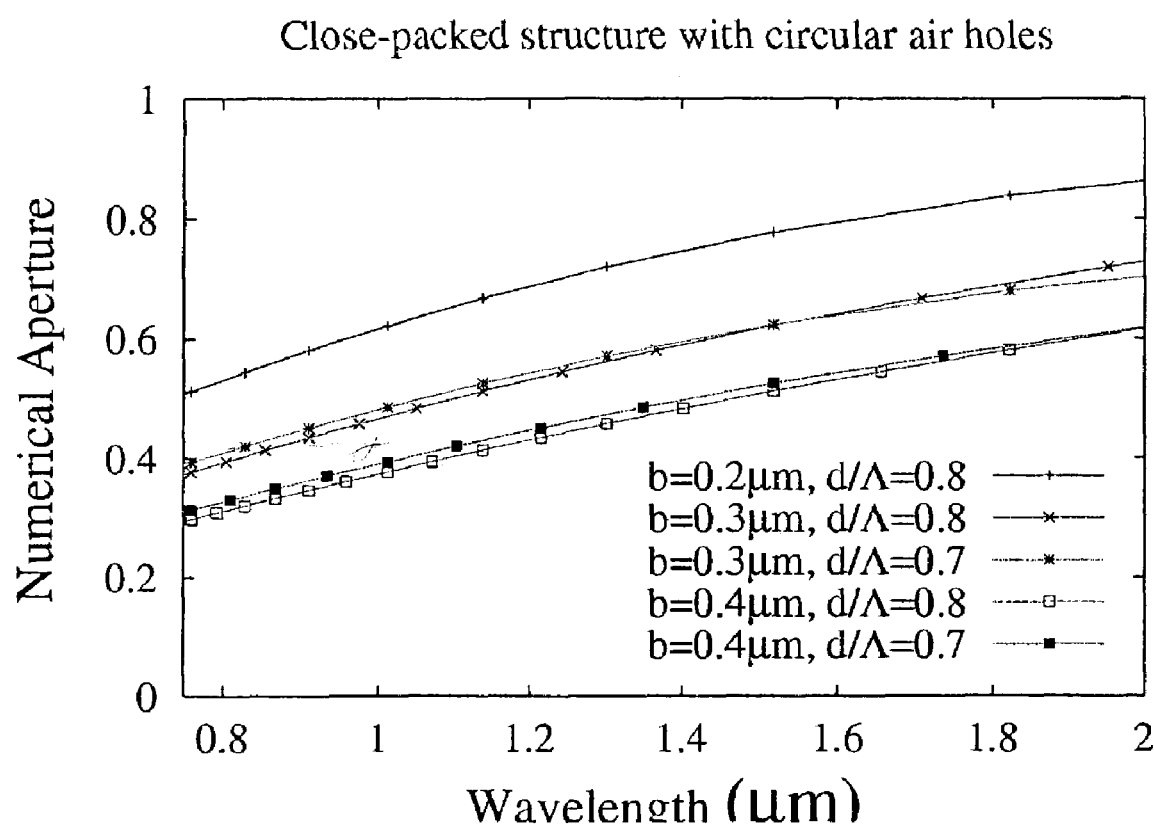

FIG. 8 compares the numerical aperture of air-clad fibres having different air filling fractions for similar bridging widths.

Figure 9:
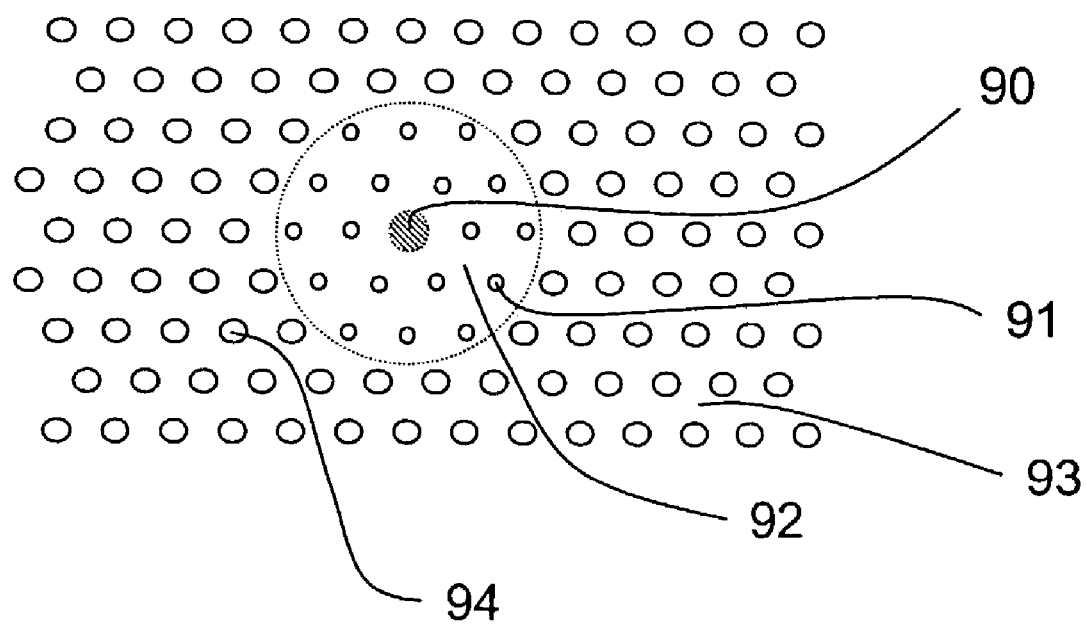

FIG. 9 shows a photonic crystal fibre cross section according to prior art in which the effective refractive index of the inner cladding is determined by a large number of periodically arranged, smaller air-holes and the effective refractive index of the outer cladding is determined by air-holes of a different cross section compared to those of the inner cladding.

Figure 10:
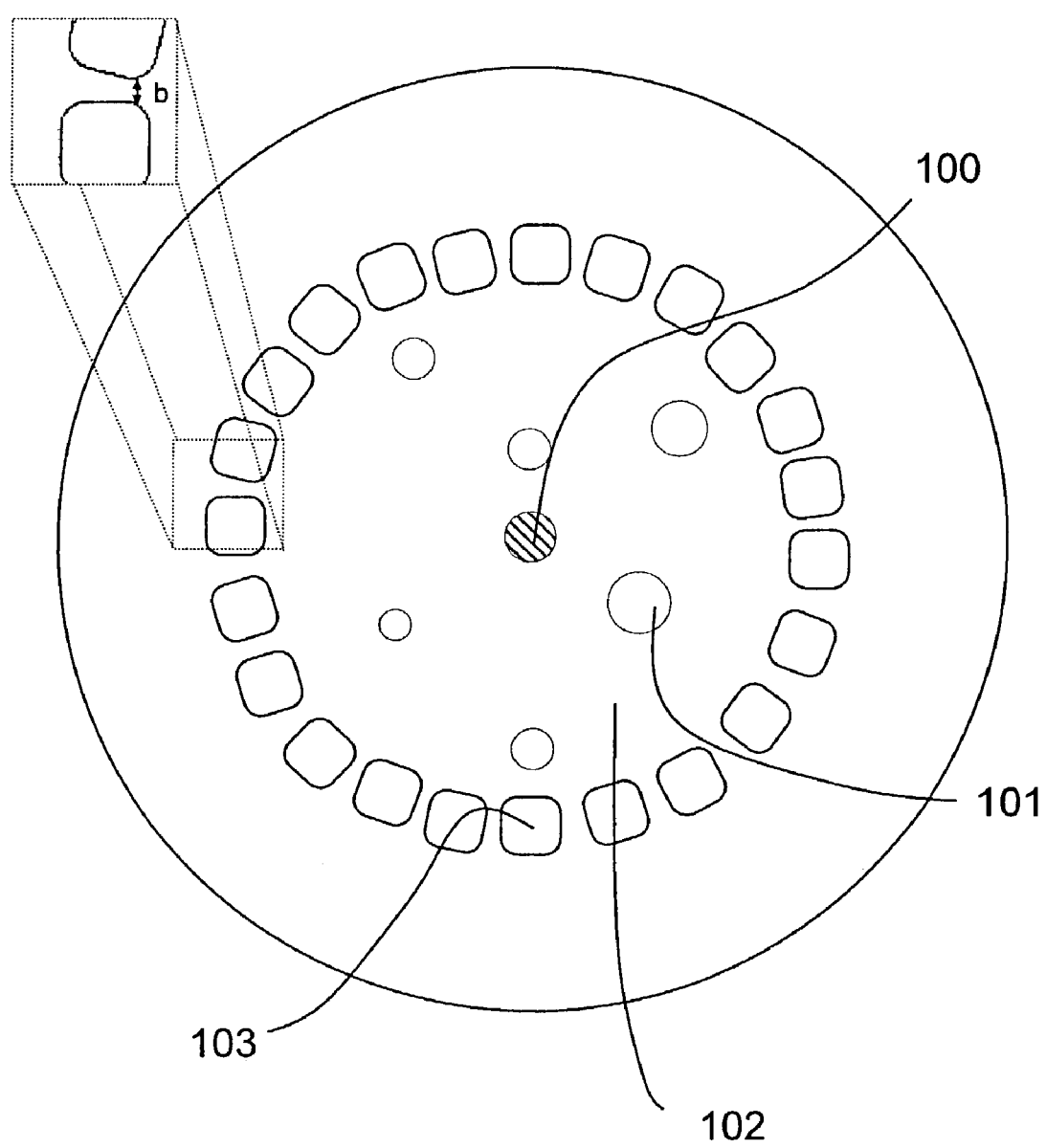

FIG. 10 illustrates an example of a photonic crystal fibre according to the invention, in which a small number of non-periodically arranged air-holes are used as extra elements in the inner cladding to assist cladding pumping.

Figure 11:
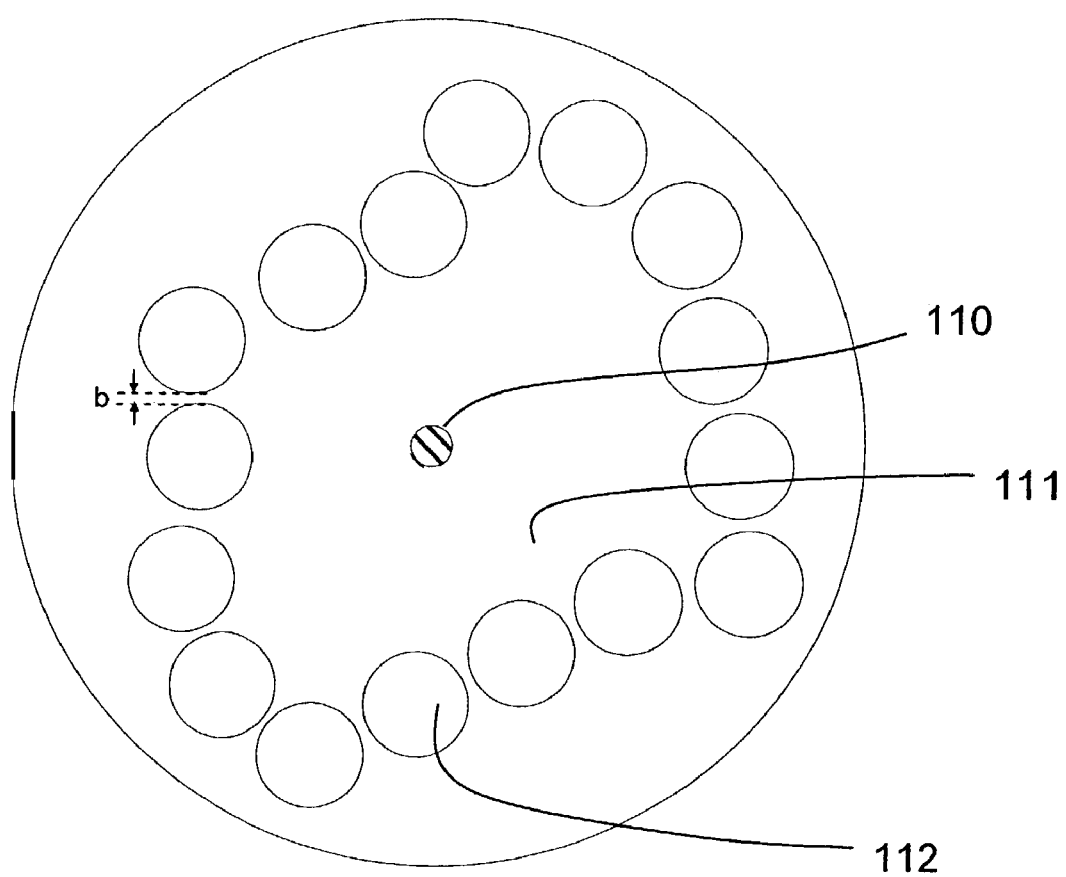

FIG. 11 illustrates an example of a cross-section of a photonic crystal fibre according to the invention, in which the air holes forming the second cladding are positioned non-circularly.

Figure 12:
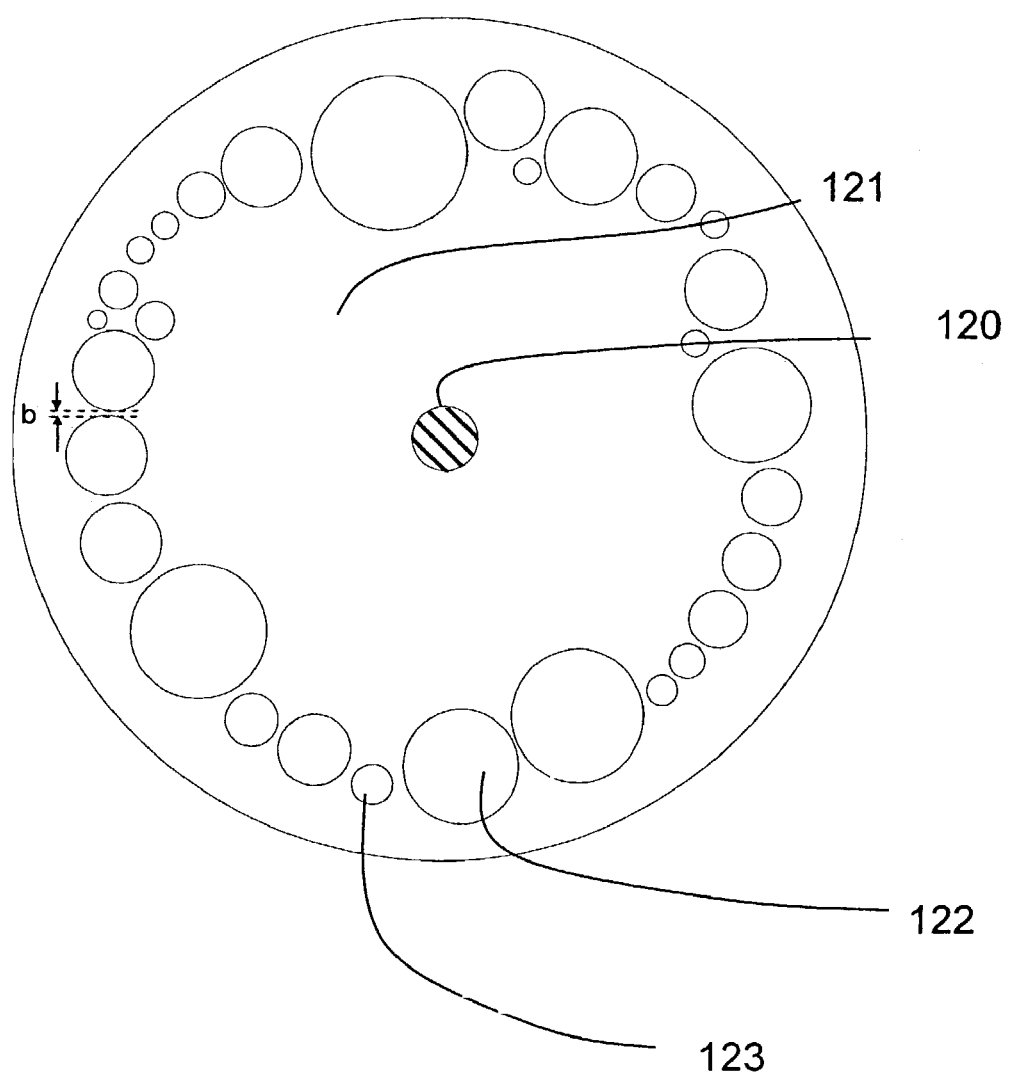

FIG. 12 illustrates an example of a cross-section of a photonic crystal fibre according to the invention, in which the air holes forming the second cladding are of various sizes.

Figure 13:
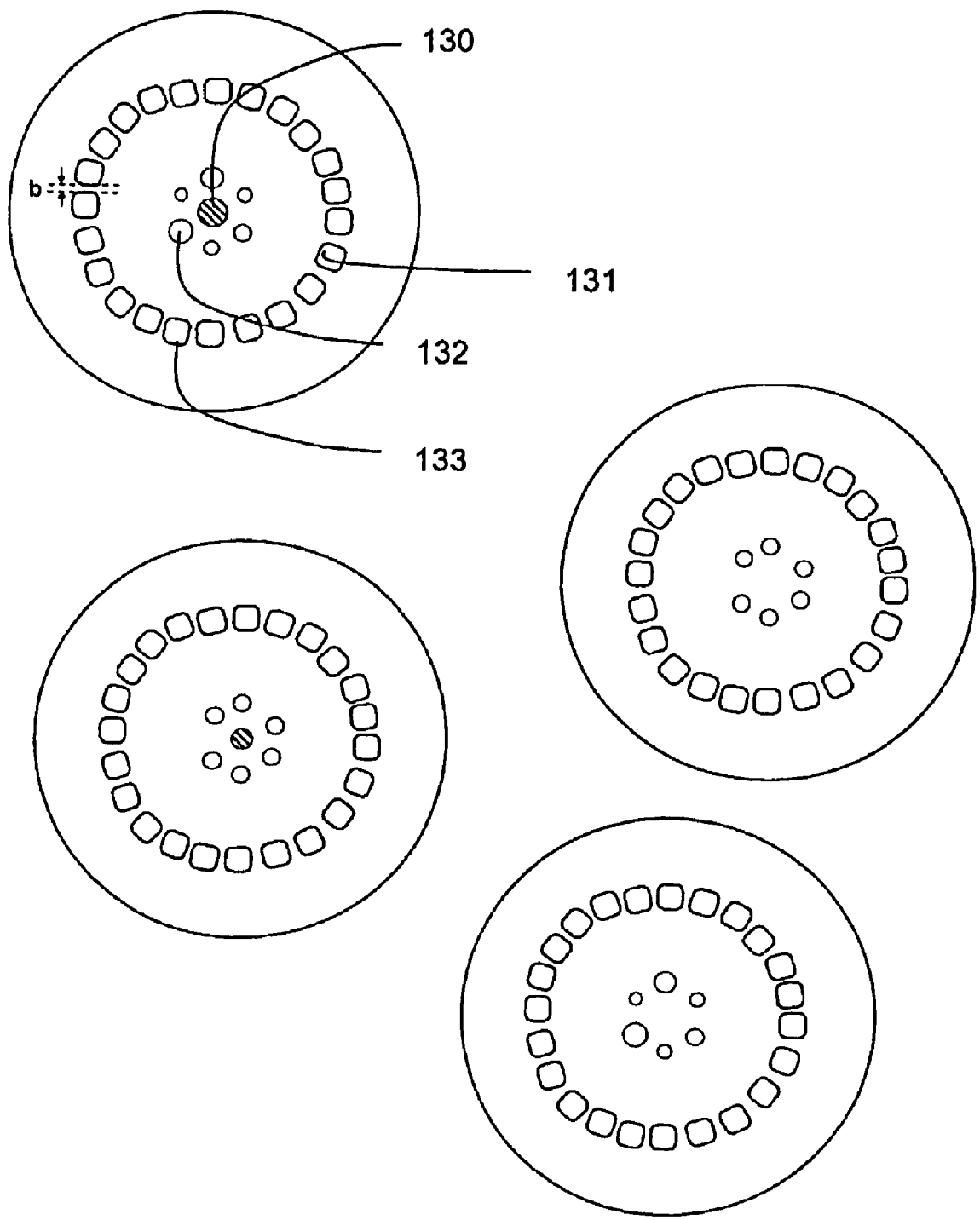

FIG. 13 shows cross-section examples of photonic crystal fibres according to the invention, in which the air holes forming the inner cladding are positioned non-circularly.

Figure 14:
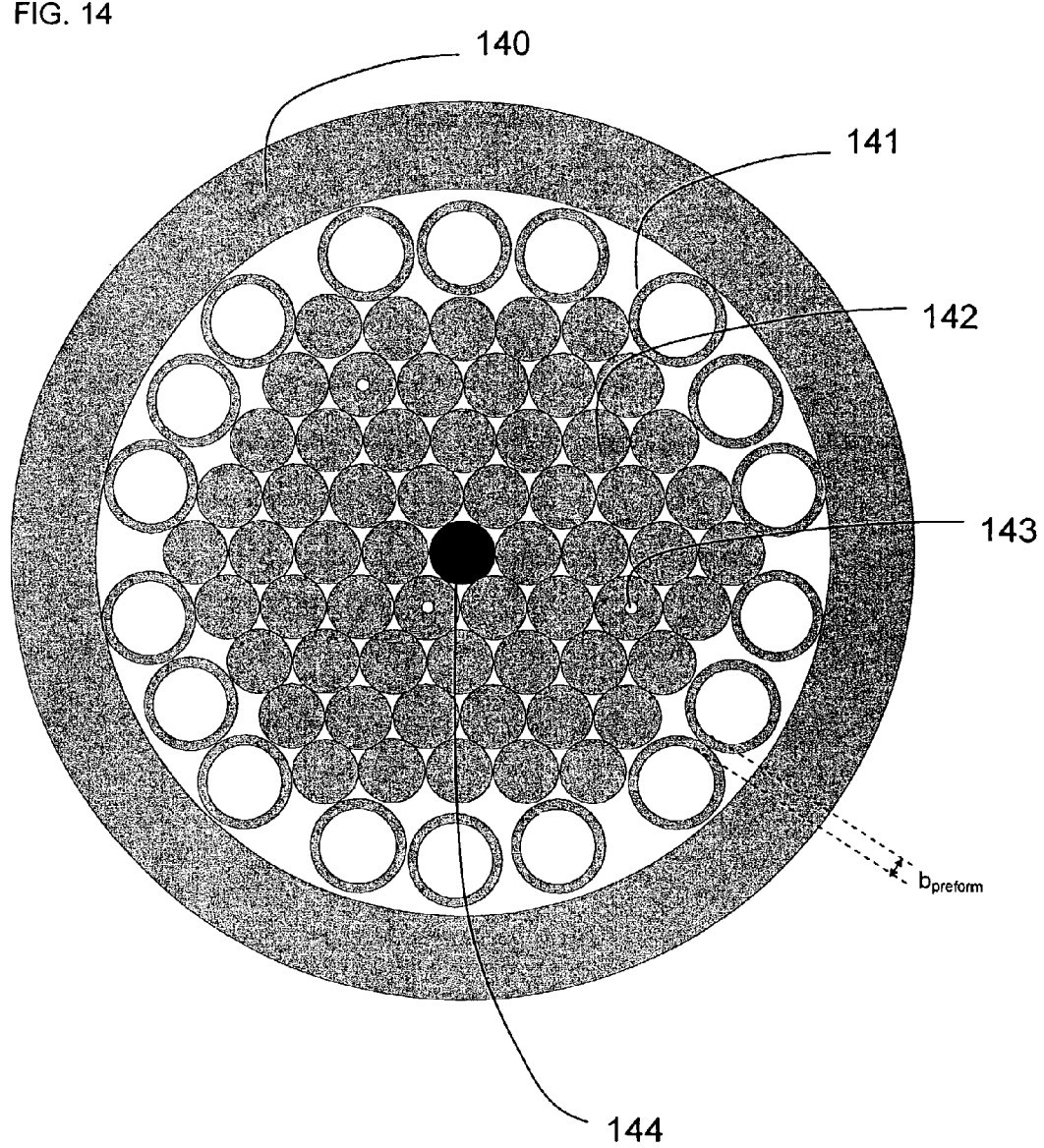

FIG. 14 illustrates an example of a cross-section of a photonic crystal fibre preform according to the invention, in which the inner and outer cladding are formed using capillaries of different air-filling fractions and the inner cladding comprises solid rods.

Figure 15:
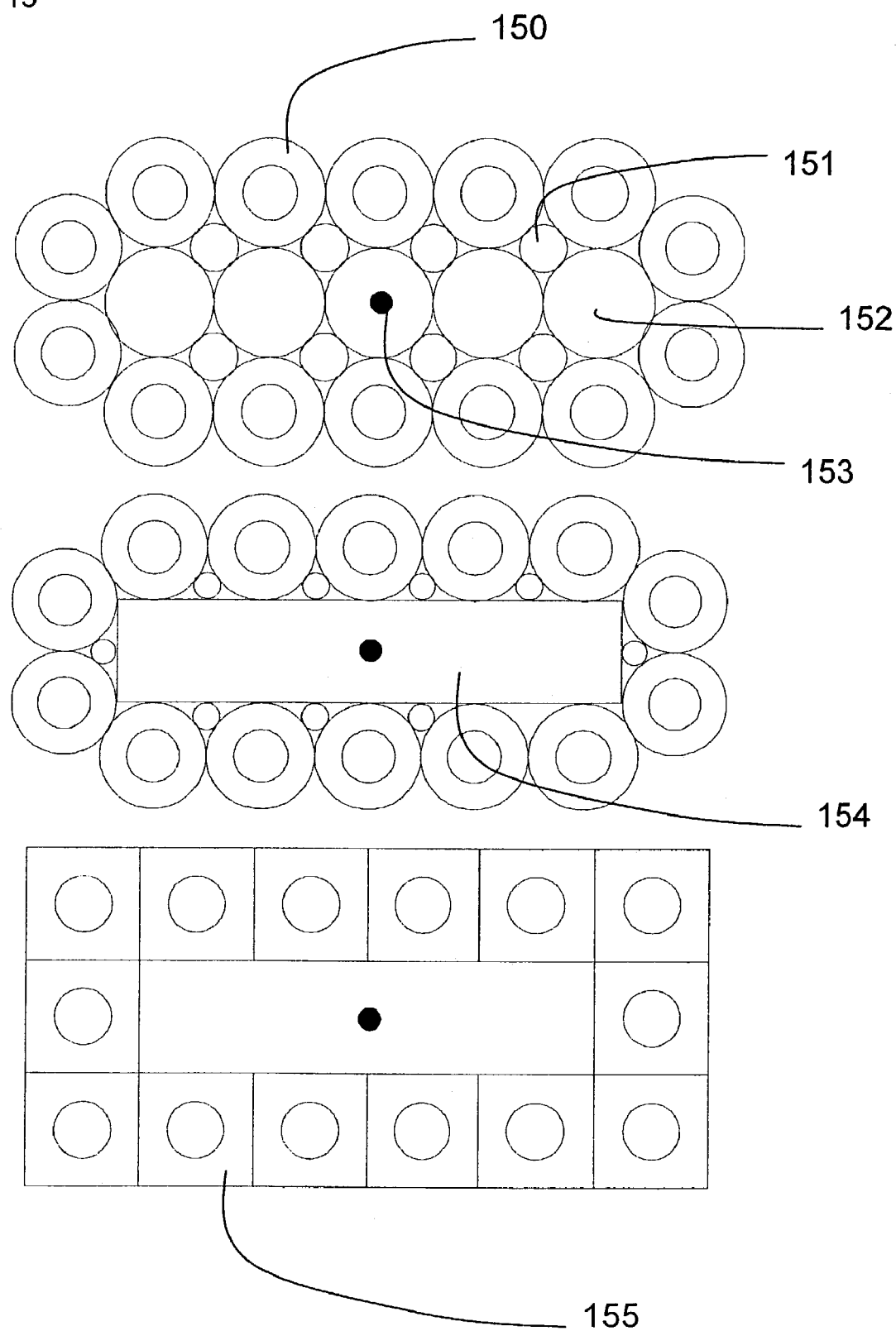

FIG. 15 illustrates an example of a cross-section of a photonic crystal fibre preform according to the invention, in which differently shaped capillaries are used to form an asymmetrical structure optimised for high coupling efficiency to laser diodes strips.

Figure 16:
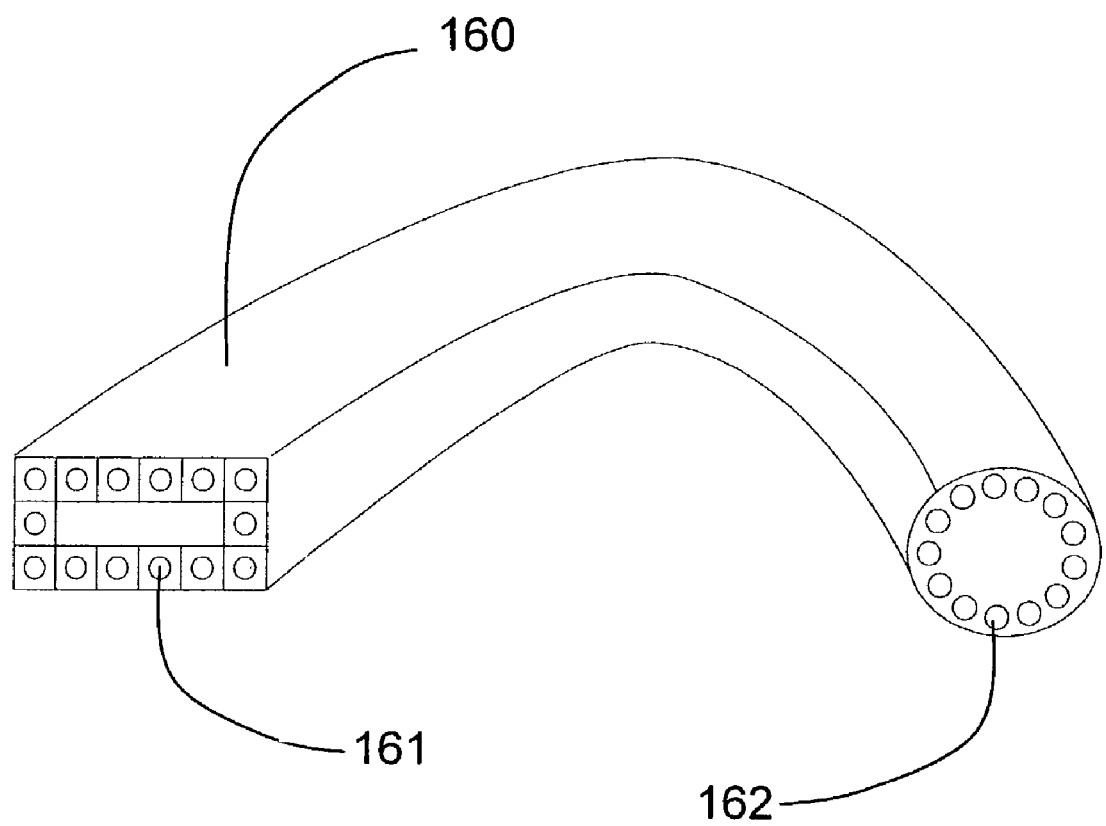

FIG. 16 shows an example of a photonic crystal fibre transition element designed for high coupling efficiency between a non-circular symmetric mode and a near circular symmetric mode.

Figure 17:
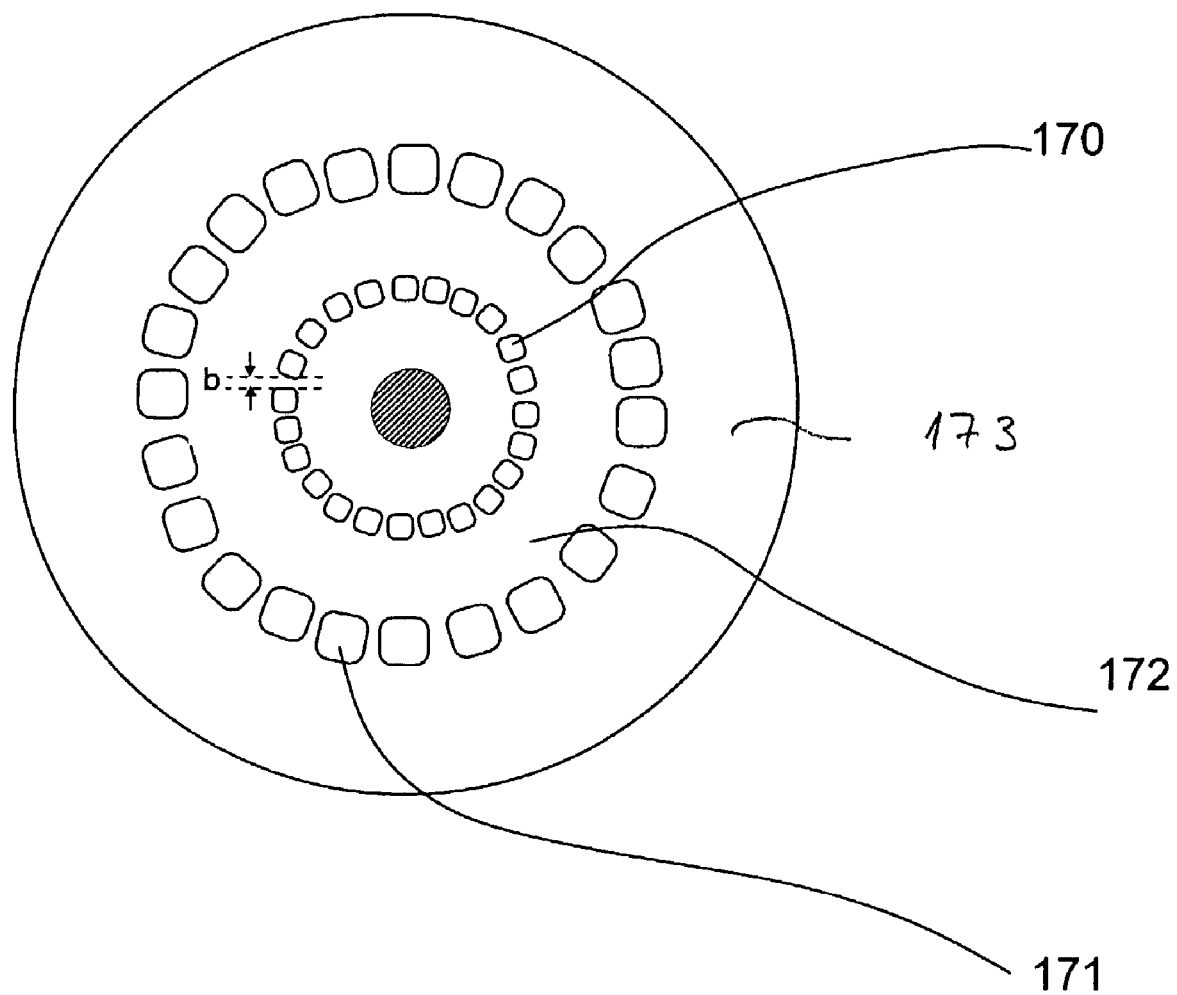

FIG. 17 shows another example of a photonic crystal fibre according to the present invention. The fibre is of a general type having a high effective index contrast between adjacent cladding layers.

Figure 18:
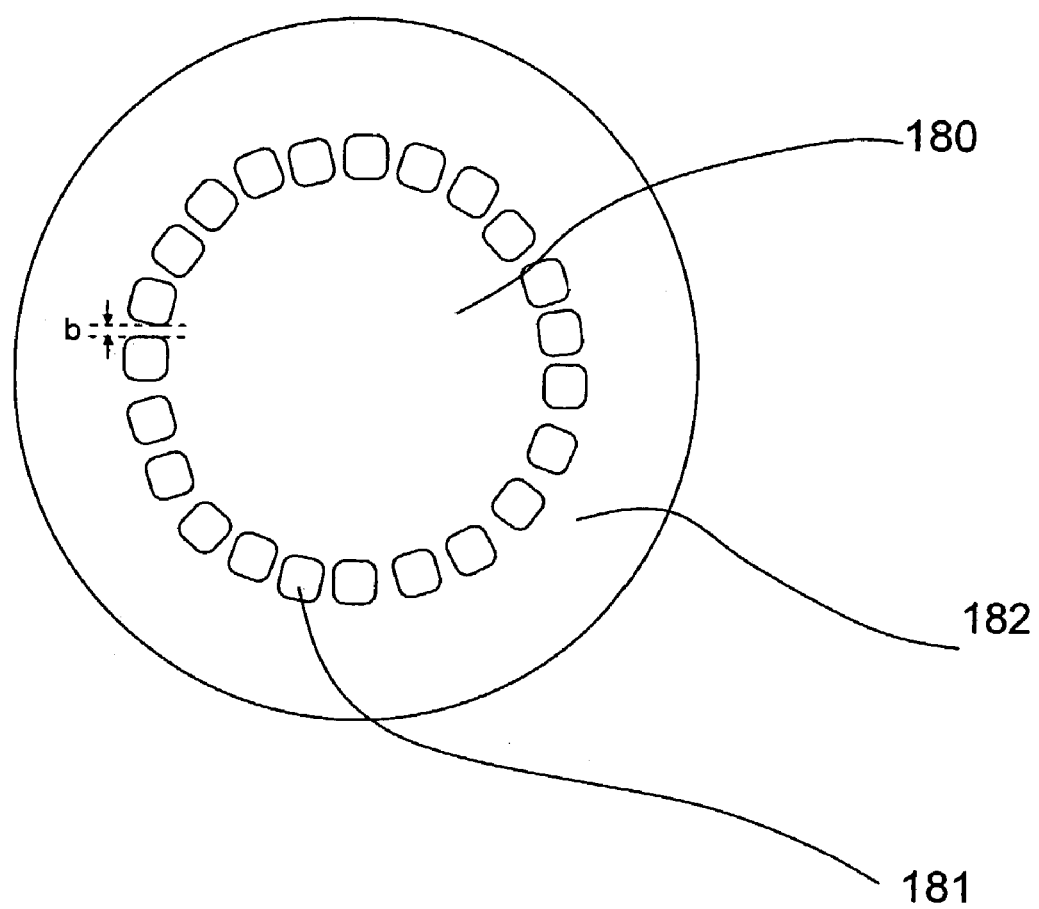

FIG. 18 shows another example of a photonic crystal fibre according to the present invention. The fibre has a large homogeneous core region surrounded by an air-clad region. The fibre is highly multimode and has a high NA.

Figure 19A:
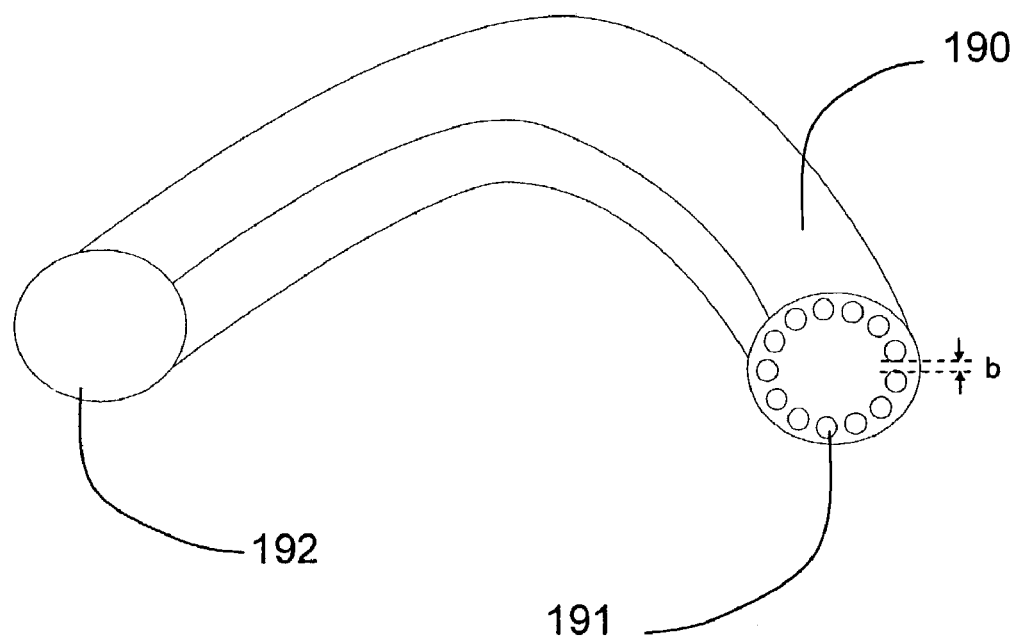
Figure 19B:
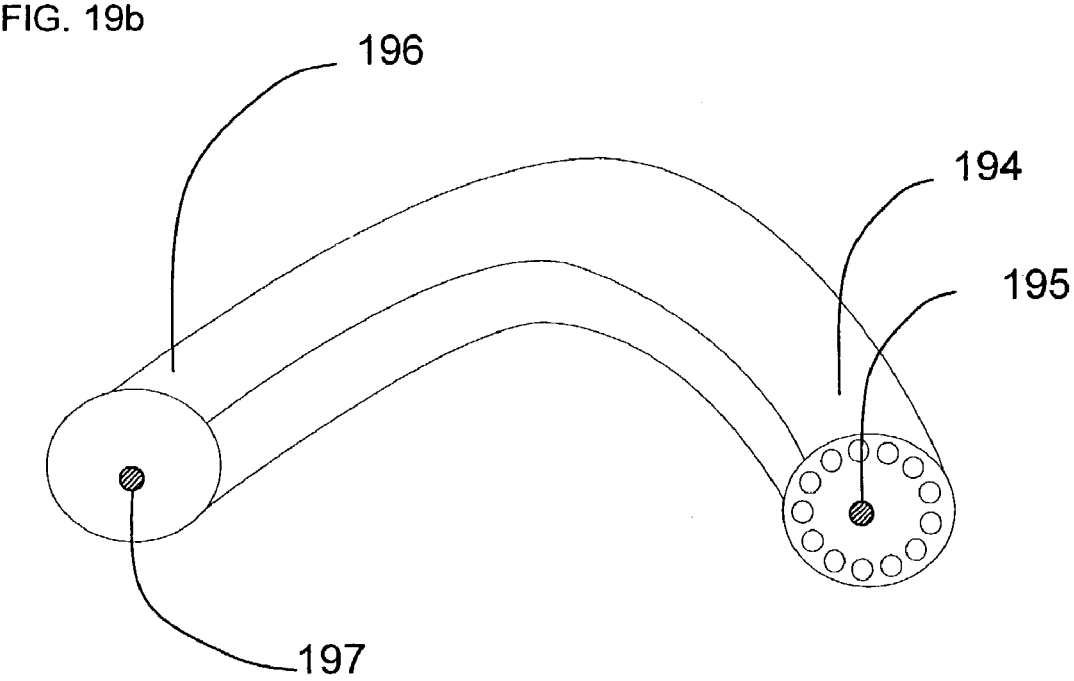

FIG. 19 shows two examples of photonic crystal fibres according to the present invention. The fibres have a high NA in one end of their length (for example an input end where light is coupled into the fibre) and a low NA in the other end. The high and low NA is obtained by controlling the air filling fraction in the air-clad region along the length of the fibres—or alternatively by collapsing the air holes at the end-facet in one end of the fibres. FIG. 19a shows a multimode fibre, and FIG. 19b shows a fibre with a doped core to provide single mode operation at a given wavelength in the doped core.

Figure 20:
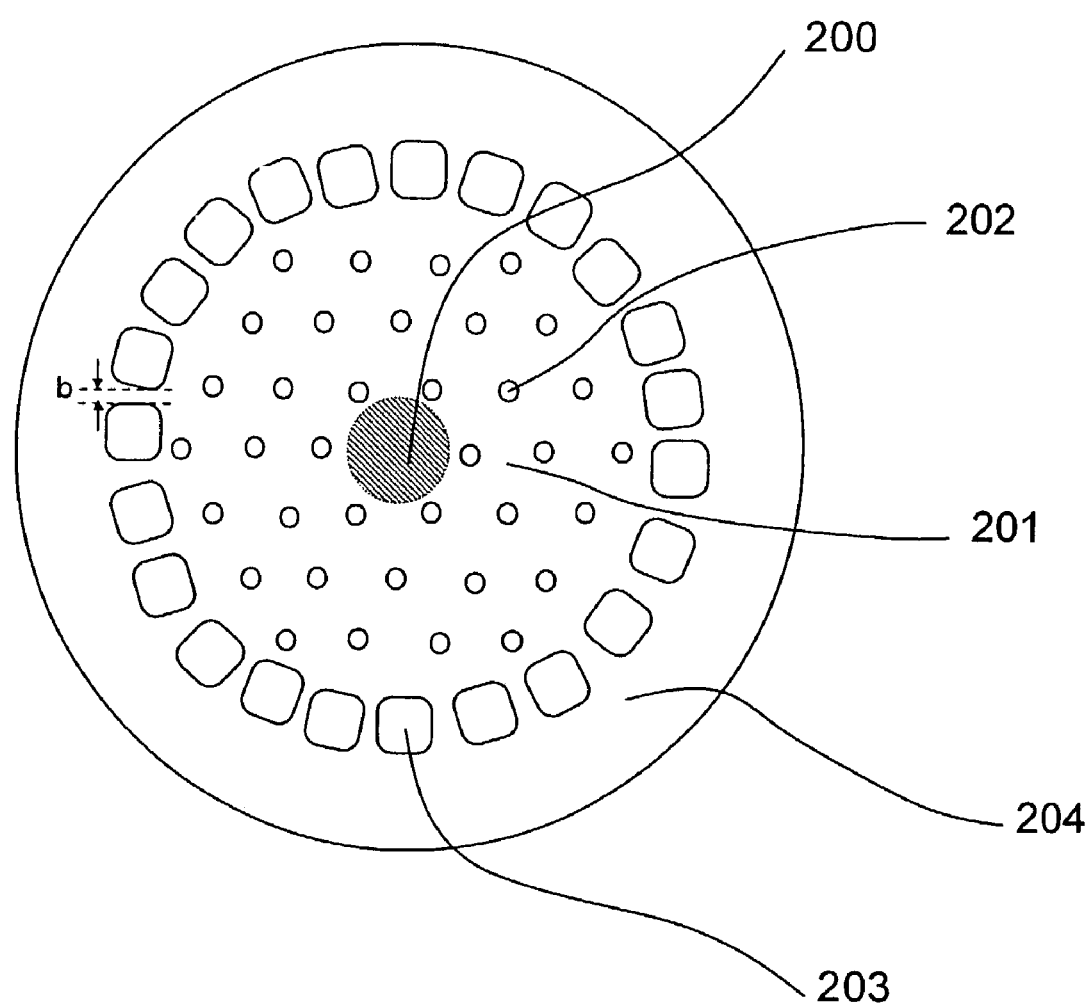

FIG. 20 shows another example of a photonic crystal fibre according to the present invention. The fibre has a large core region where light may be guided in a single mode. The fibre further has a microstructure in the inner cladding acting to support only single mode in the core and an air-clad region acting to provide a high NA for modes in the inner cladding.

Figure 21:
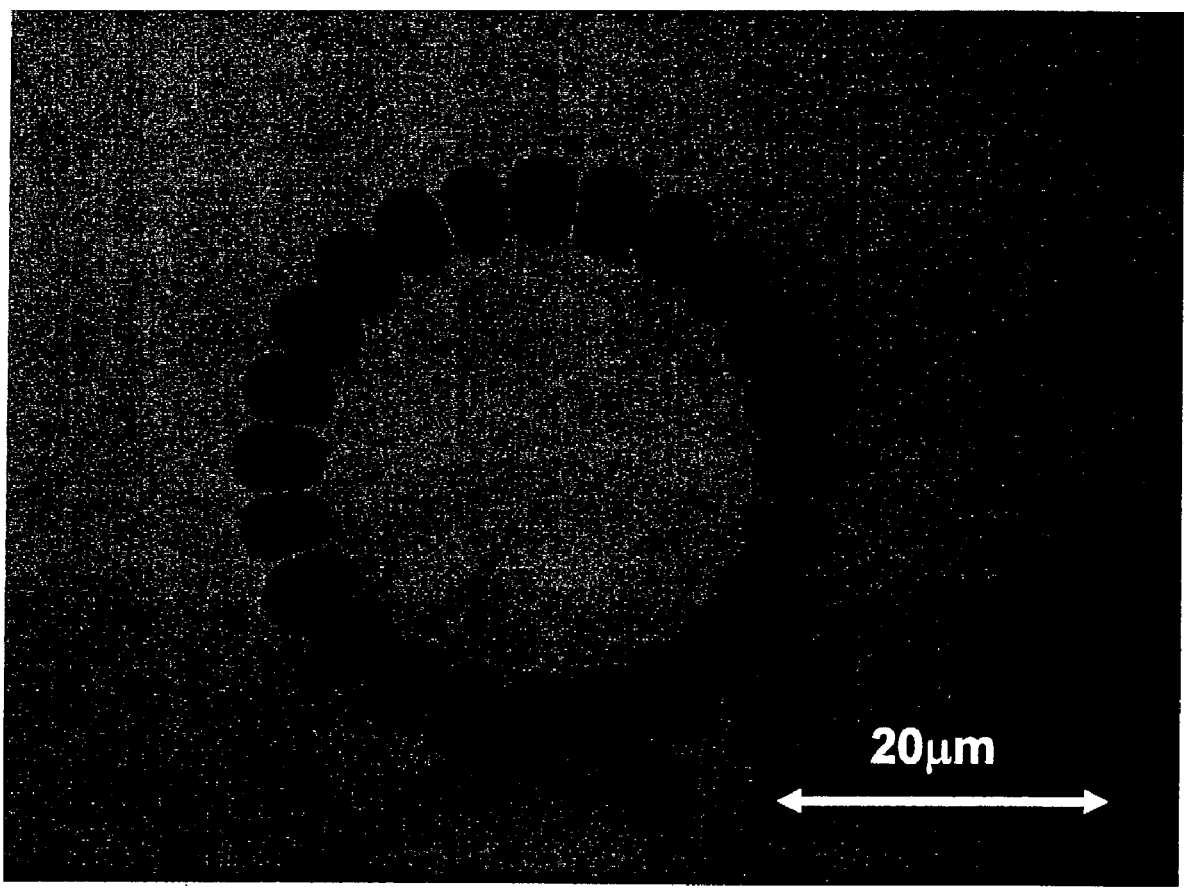

FIG. 21 shows an example of a real photonic crystal fibre according to the present invention. The fibre has an air-clad region with narrow bridging regions that provide a high NA of the fibre.

Figure 22:
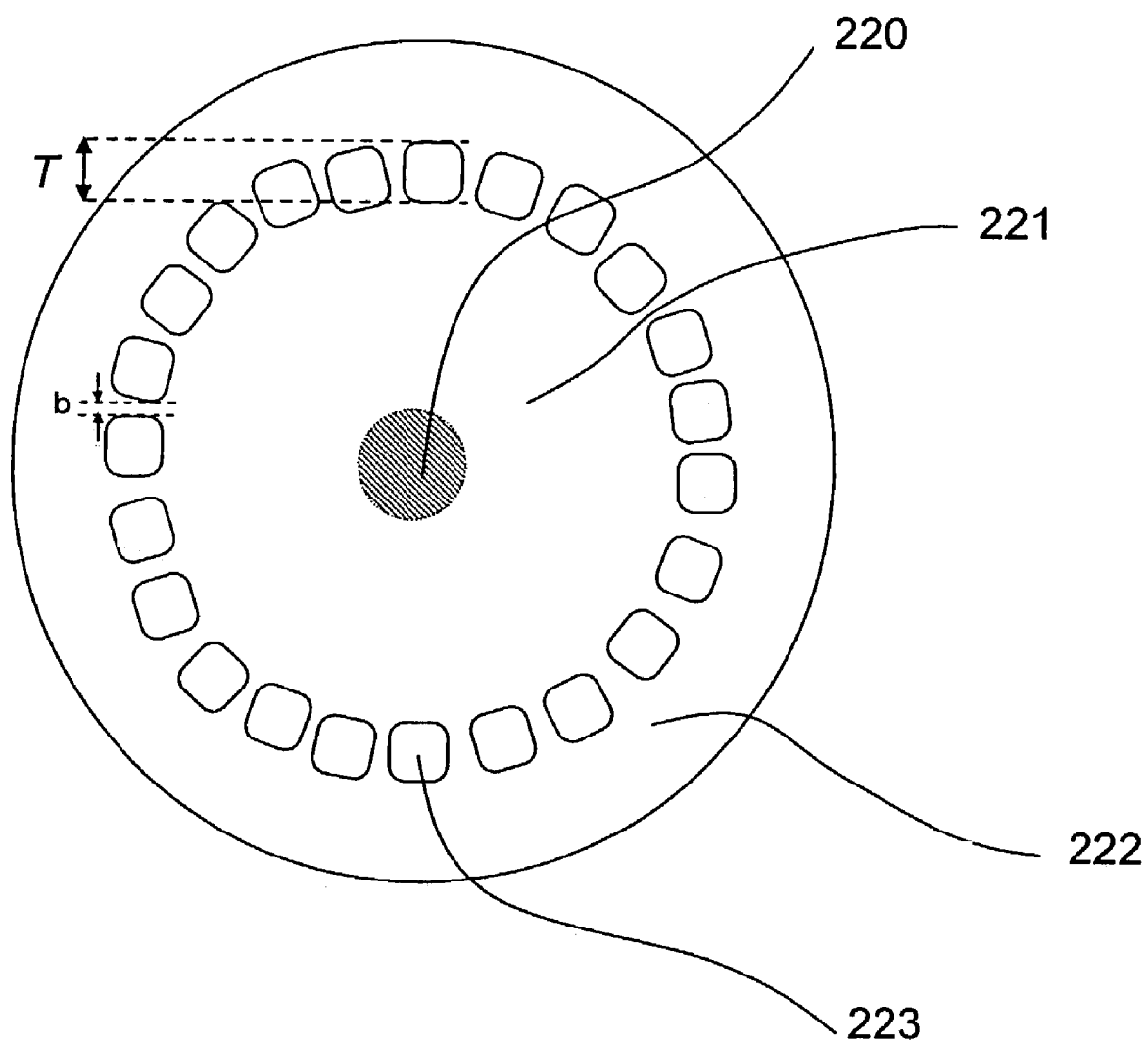

FIG. 22 illustrates schematically the parameter, T, which is used to characterise the thickness of the air-clad layer.

Figure 23A:
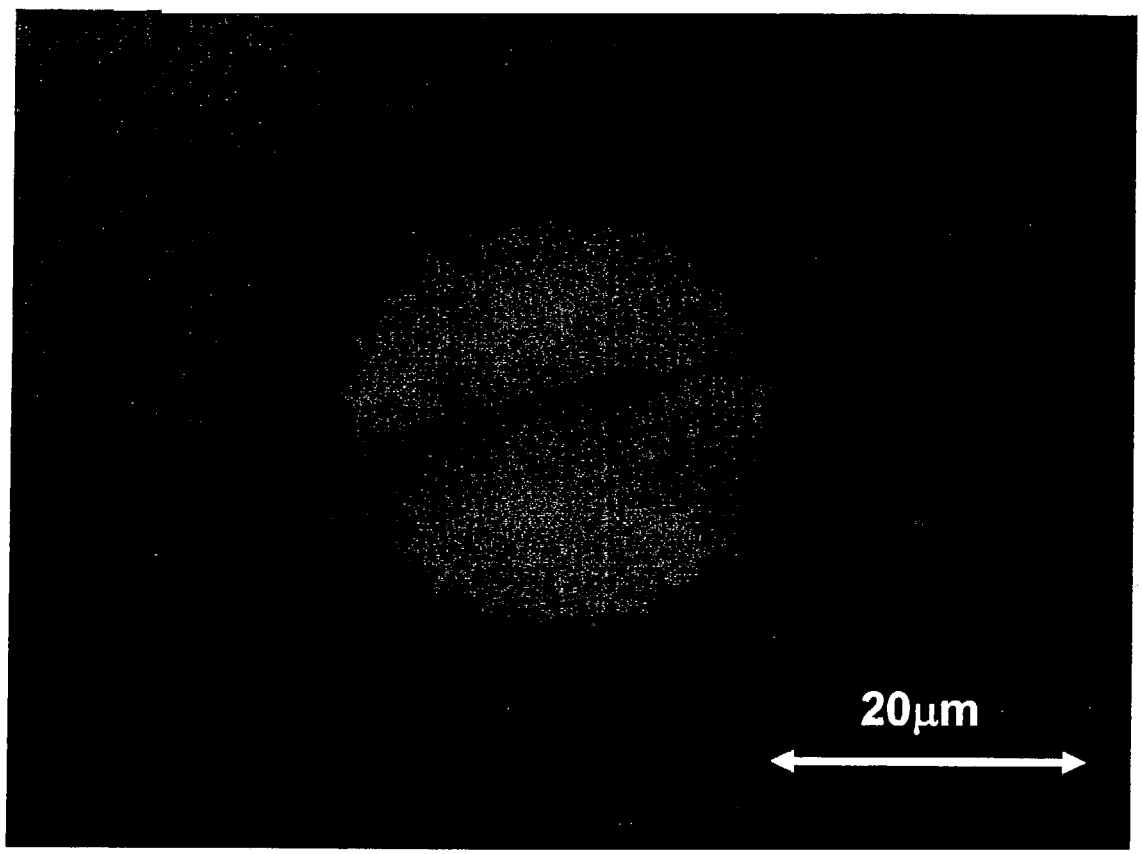
Figure 23B:
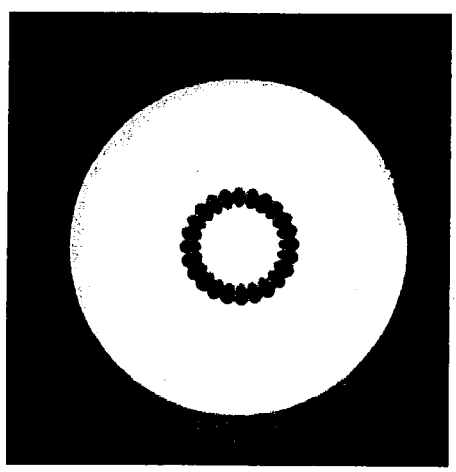

FIG. 23 shows another example of a real photonic crystal fibre according to the present invention. The fibre has an air-clad region with narrow bridging regions that provide a high NA of the fibre. The fibre in FIG. 22a has a larger thickness of the air-clad region than the fibre shown in FIG. 21, but the NA of the two fibres is practically identical. FIG. 22b shows the complete cross-section of the fibre.

Figure 24:
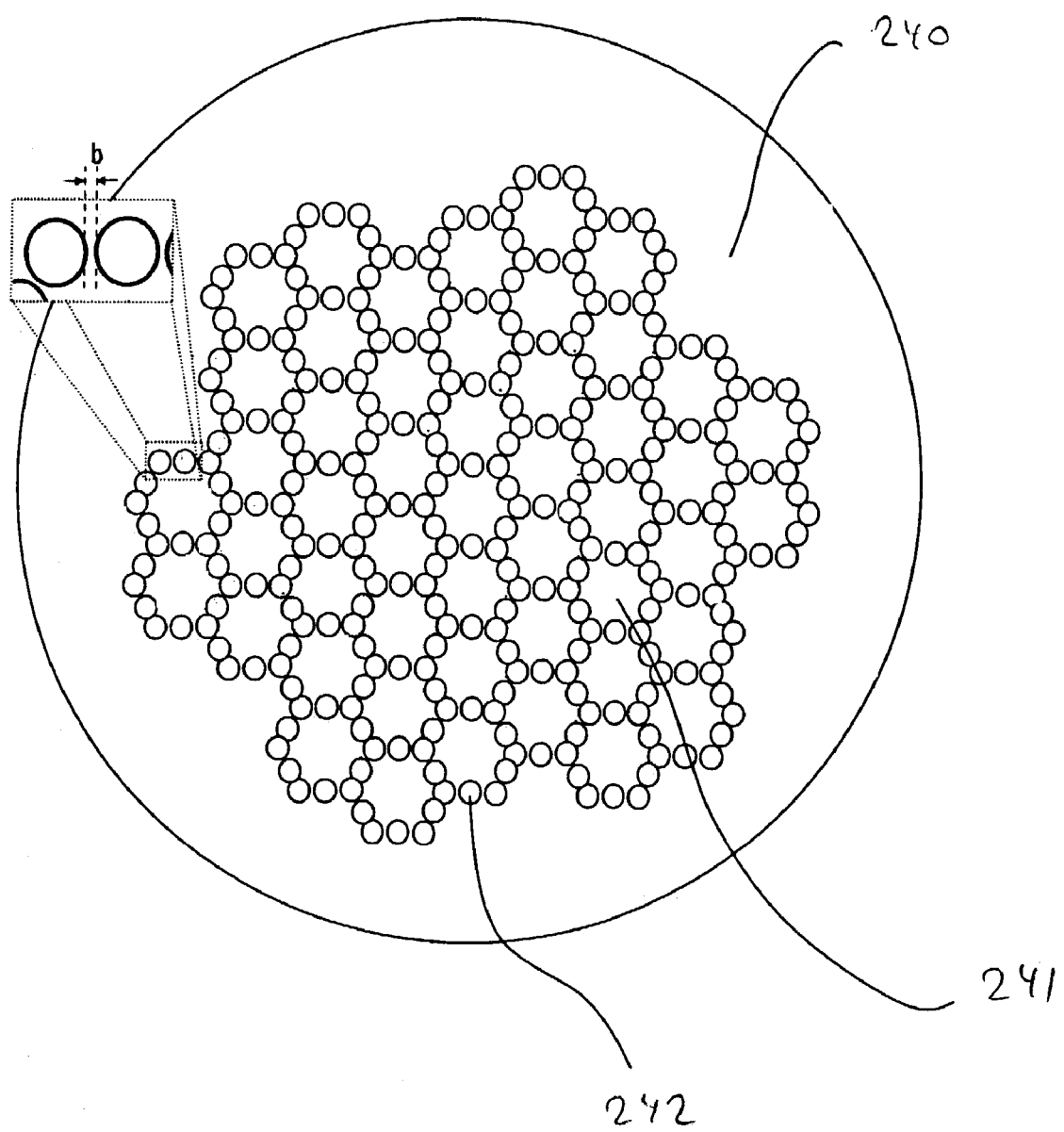

FIG. 24 shows schematically an example of a fibre according to the resent invention for use in endoscopes. The fibre comprises a large number (typically more than 100) multi-core elements that are separated from each other using air-clad layers with thin bridging regions.

Figure 25:
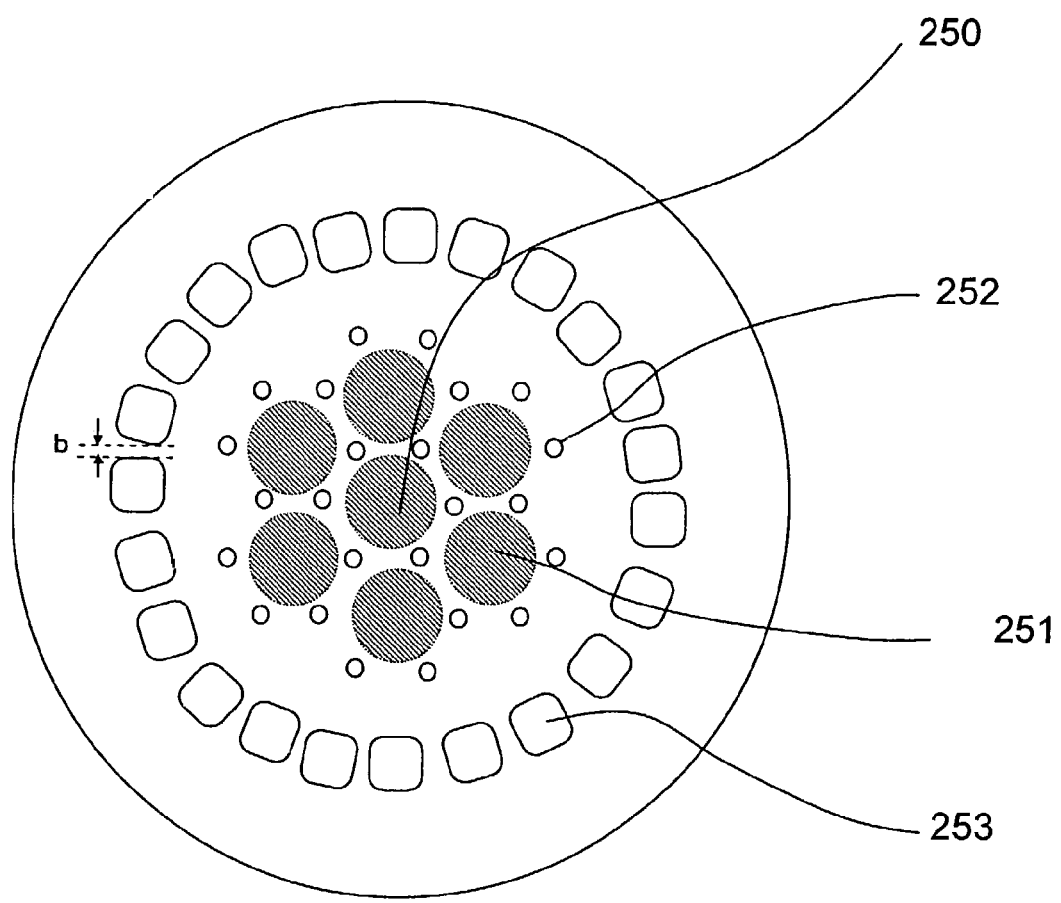

FIG. 25 shows a multi-core fibre according to the present invention. The fibre may be used as a high-brightness laser.

Figure 26:
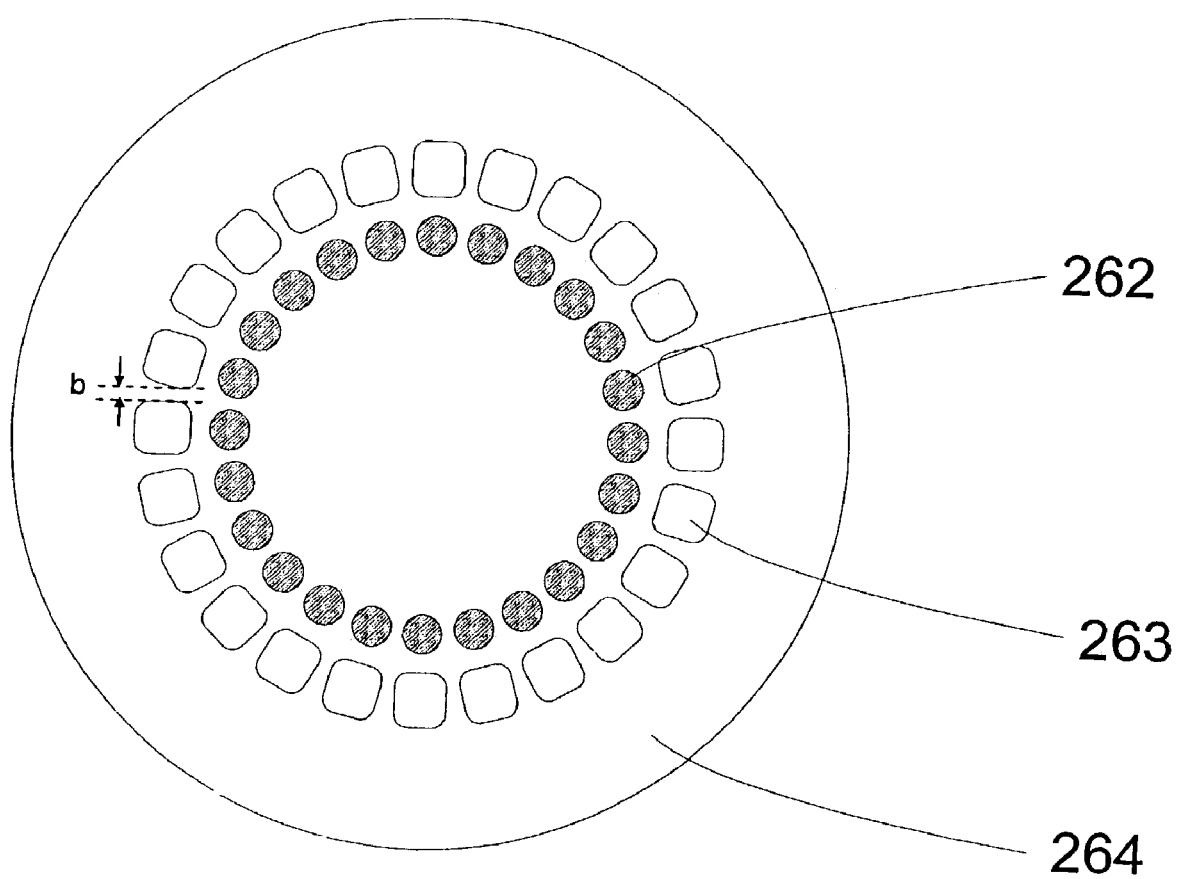

FIG. 26 shows another example of a multi-core fibre according to the present invention.

Figure 27:
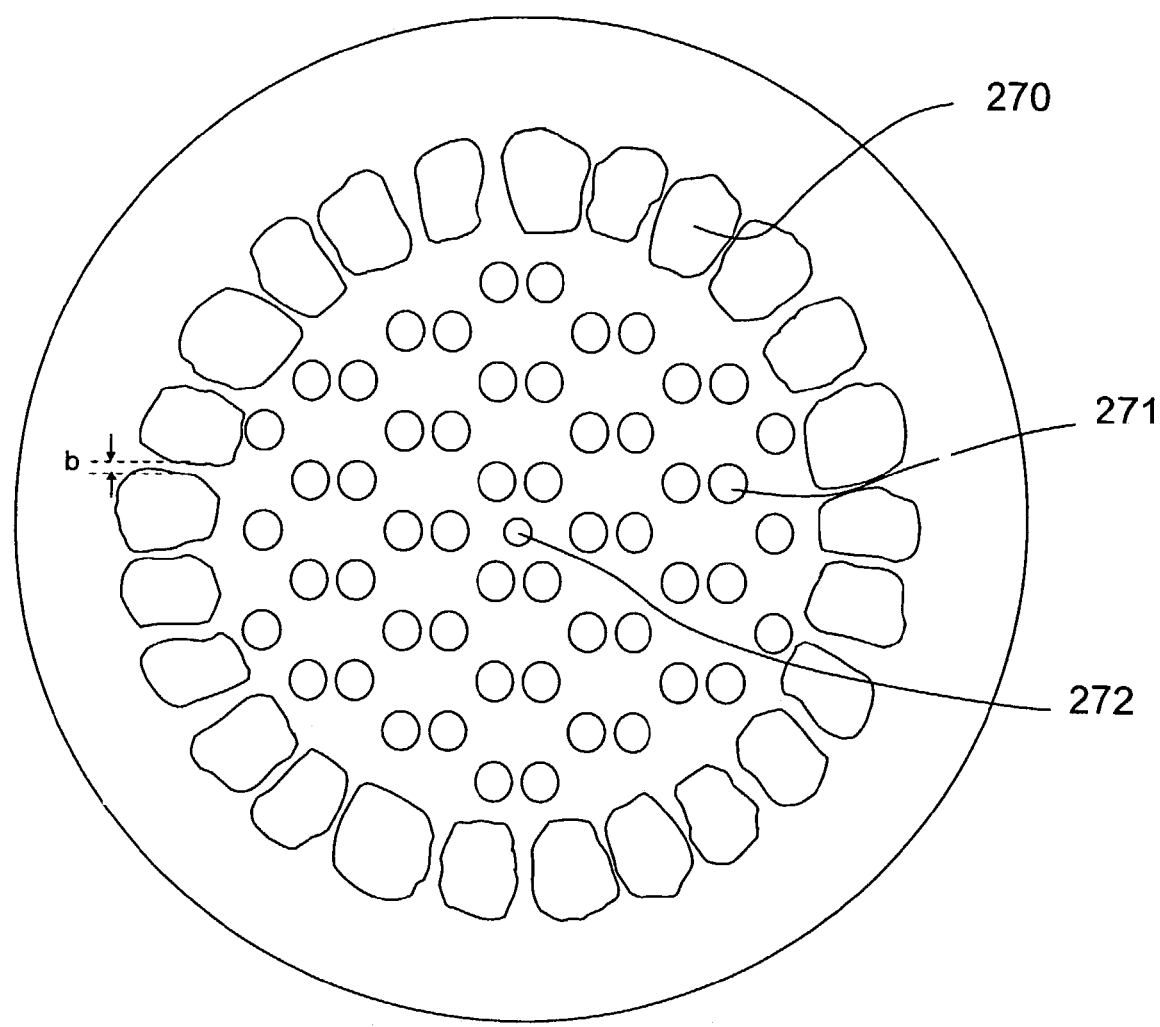

FIG. 27 shows schematically an optical fibre according to the present invention, wherein periodically distributed features in the inner cladding provides confinement of signal light using PBG effect.

Figure 28:
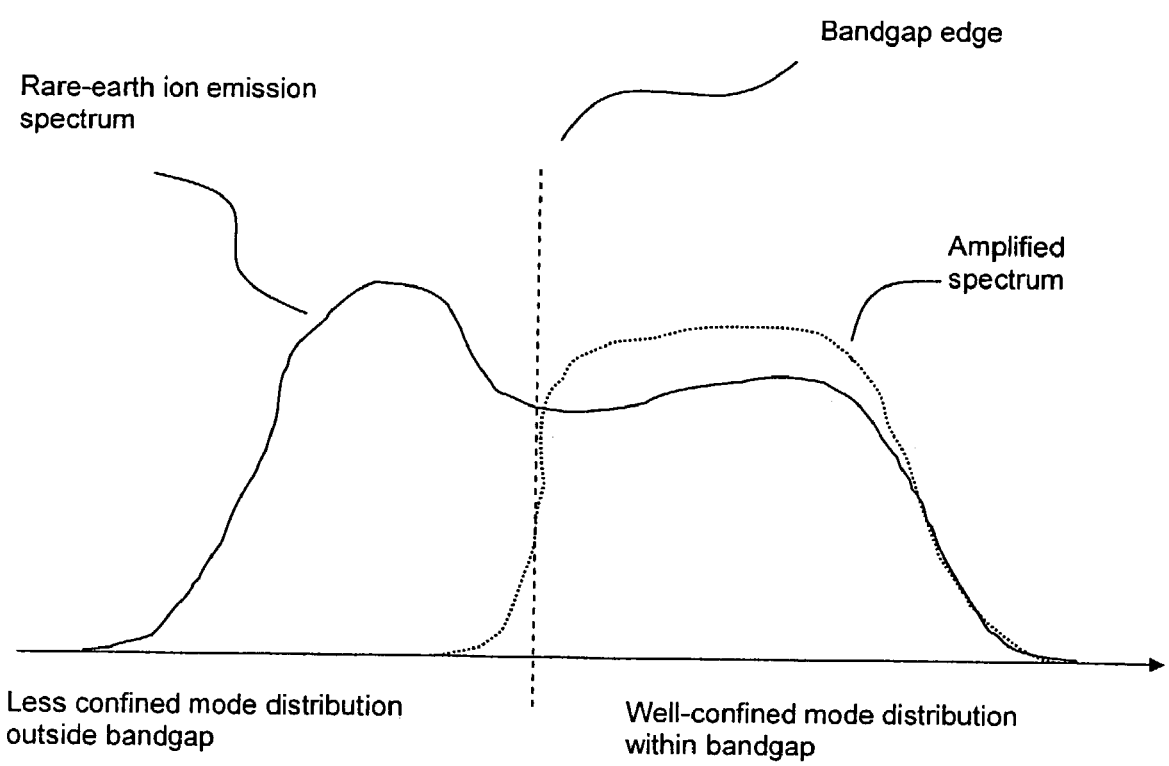

FIG. 28 shows schematic the operation of a fibre amplifier or a fibre laser, where improved efficiency is obtained through the use of PBG effect.

FIG. 29 shows experimental and simulated results of NA for two fibres with different bridging widths as a function of wavelength.

Figure 30:
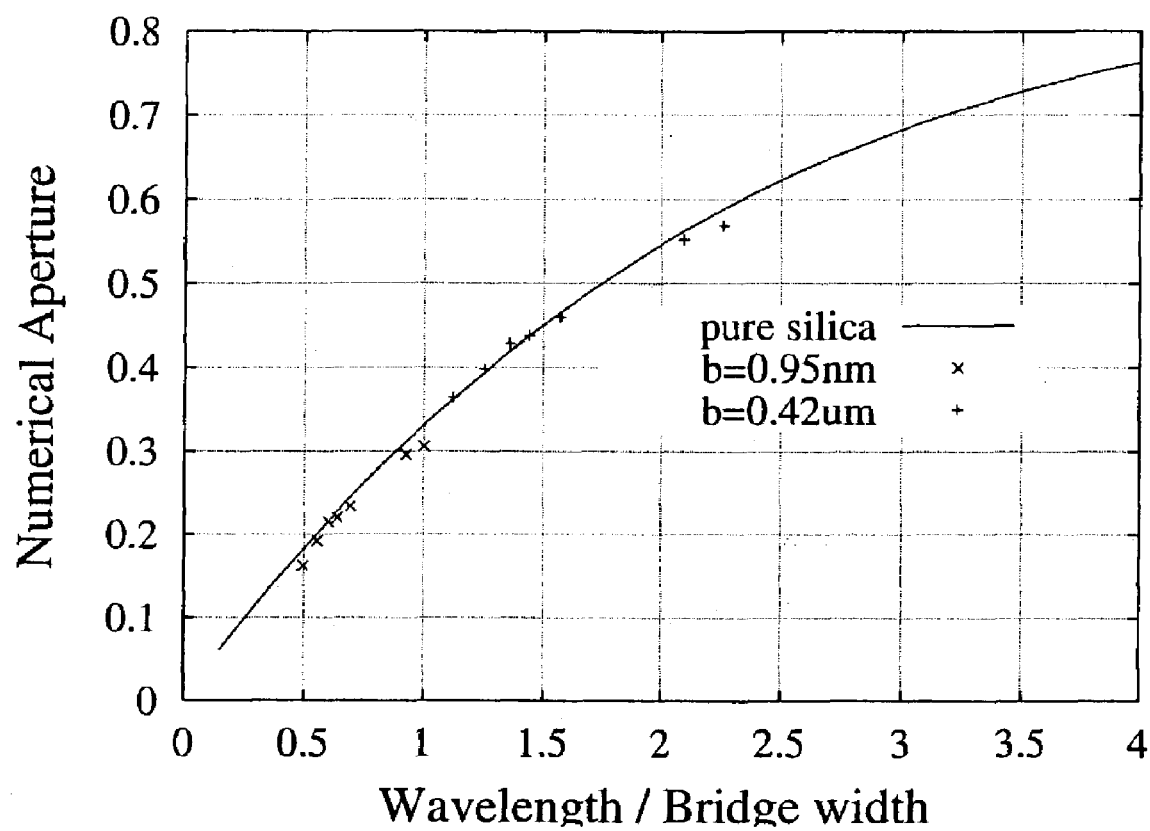

FIG. 30 shows experimental and simulated results of NA as a function of wavelength divided by the bridging width.

Figure 31:
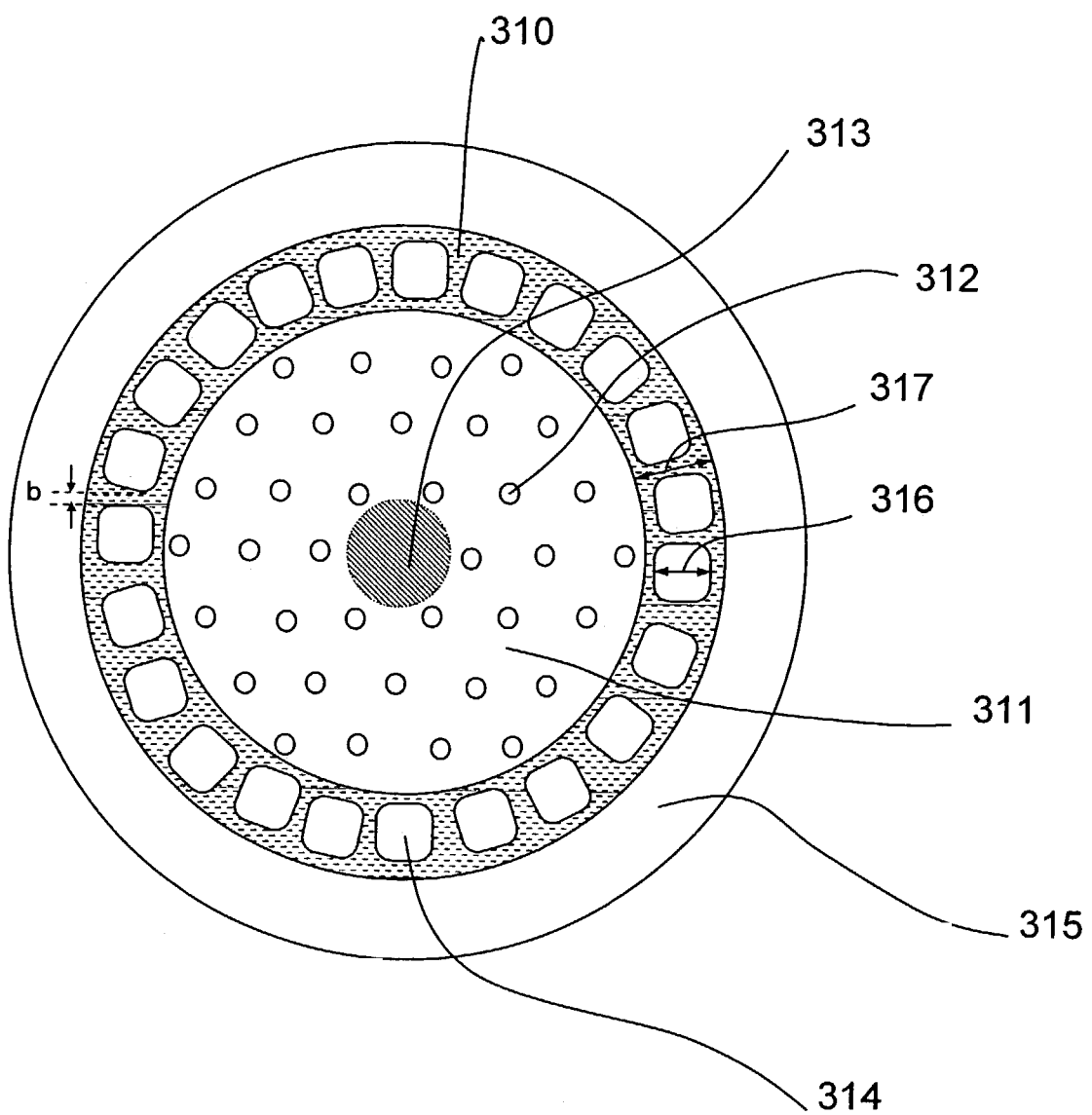

FIG. 31 shows schematically the cross-section of an optical fibre according to the present invention having a lower refractive index in the bridging regions compared to the background material of the inner cladding region.

Figure 32:
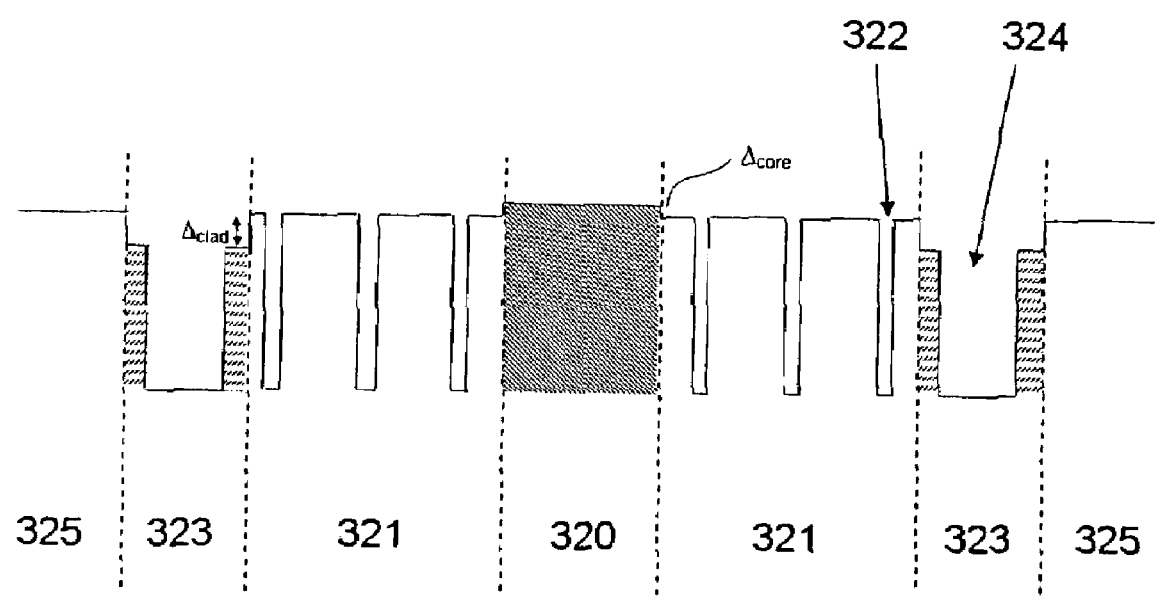

FIG. 32 shows schematically the refractive index profile along one direction in the cross-section of a fibre according to the present invention having a lower refractive index in the bridging regions compared to the background material of the inner cladding region.

Figure 33:
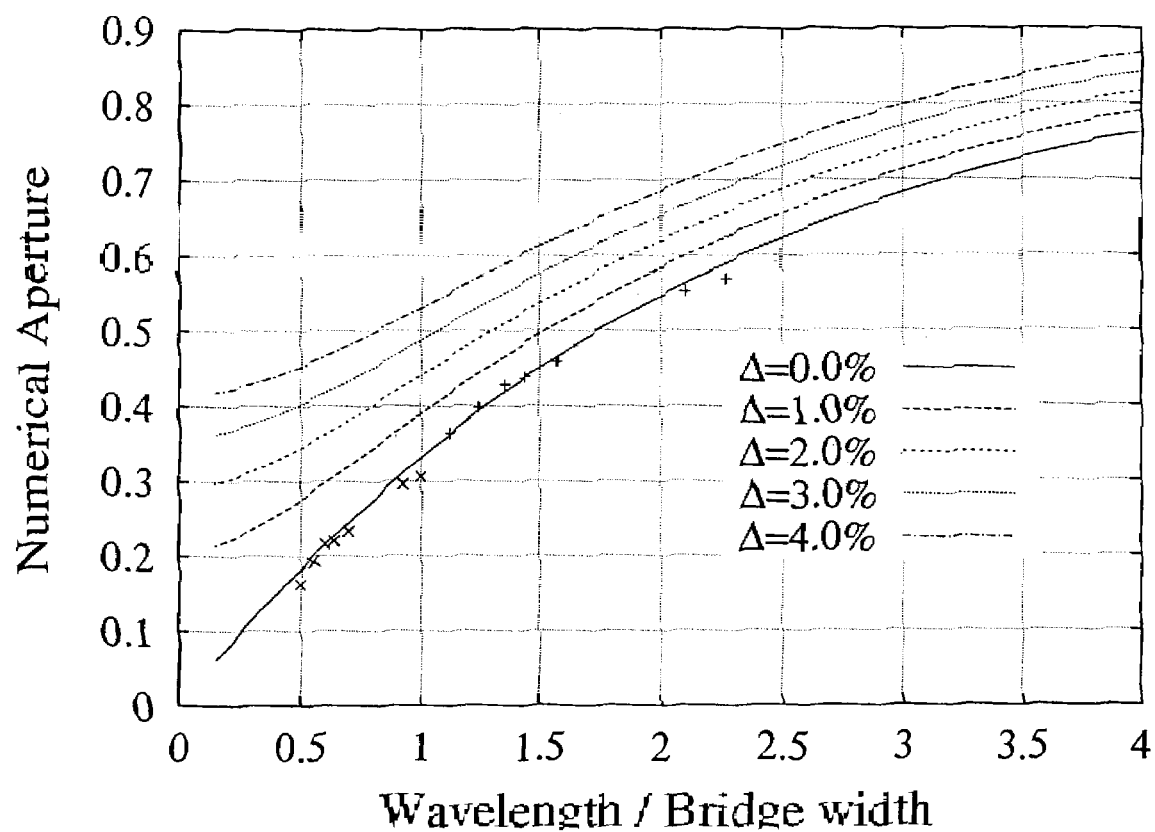

FIG. 33 shows simulated results of NA as a function of wavelength divided by the bridging width for fibres with different refractive index contrasts between the bridging regions and the background material of the inner cladding region.

4. DETAILED DESCRIPTION

This description of the present invention is based on examples. The invention is in no way limited to the presented examples that merely act to illustrate the concepts and design ideas that underlie the invention.

Figure 1:
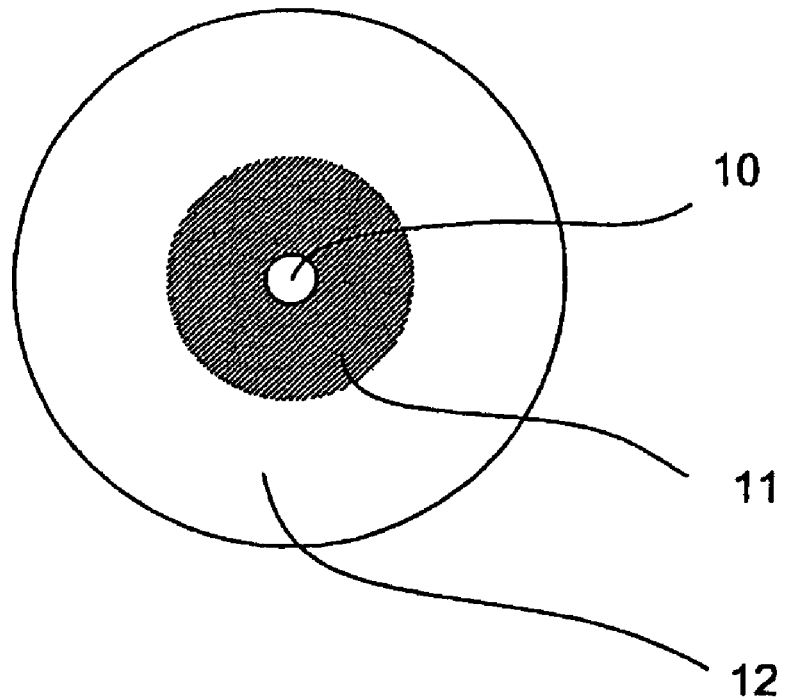
FIG. 1 shows a double-clad fibre according to prior art, in which the inner cladding is circular.

FIG. 1 shows an example of a typical double clad fibre known in the prior art. This type of fibre is widely used for cladding pumped fibre amplifiers and lasers. The fibre is characterised by a core region 10 and two cladding regions; an inner cladding region 11 and an outer cladding region 12. Typically, the refractive index of the core region is higher than that of the inner cladding region, whereby the core may acts as a core in a conventional single mode optical fibre, and the inner cladding region has a higher refractive index than that of the outer cladding region, whereby a number of cladding modes may be guided in the inner cladding. The principle of the fibre as a cladding pumped amplifier or laser device is merely that pumping of an active material in the fibre core is facilitated using the cladding modes as means for transferring pump light from a pump laser to the core. High power lasers are typically multi-mode and may more efficiently be coupled to cladding modes of the double clad fibre than directly to a mode in the core. By transfer of optical energy from the cladding modes to the core mode along the fibre length, an overall more efficient pumping may be achieved compared to direct coupling of pump laser light into the fibre core. In the section regarding background of the invention a number of references to this type of fibre device may be found (see also U.S. Pat. No. 5,937,134).

Figure 2:
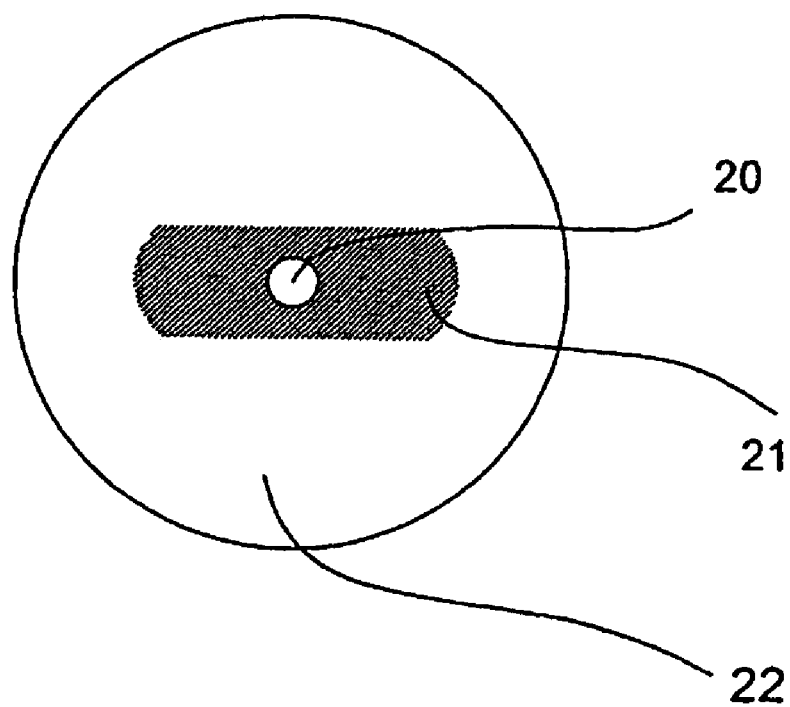
FIG. 2 illustrates a double-clad fibre according to prior art, in which the inner cladding is elongated in one transverse direction.
Figure 3:
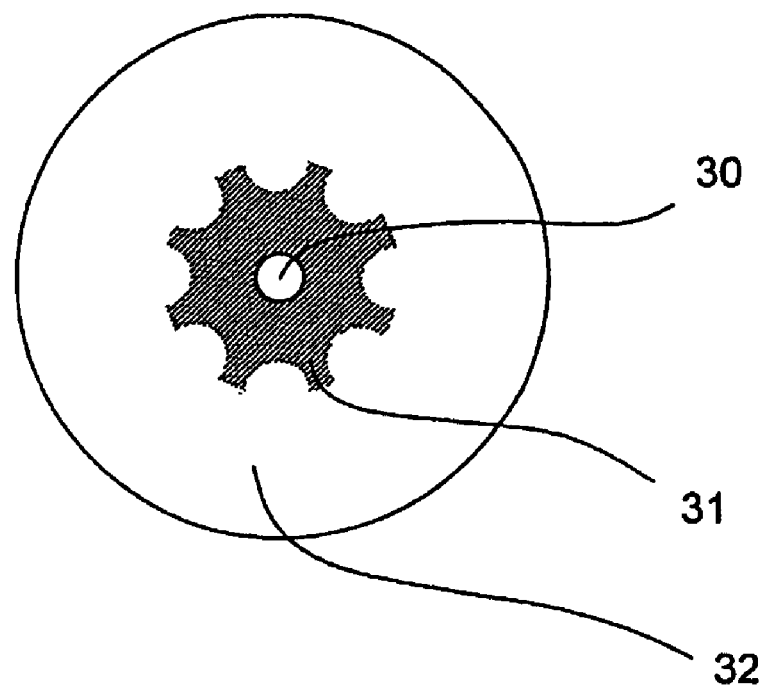
FIG. 3 illustrates a double-clad fibre according to prior art, in which the inner cladding is non-circular, having a leafed cross-section.

To improve the transfer of energy from cladding modes to a core mode, a non-circular shape of the inner cladding region is often employed. FIG. 2 shows an example of a prior art double clad fibre having a nearly rectangular shaped inner cladding region 21 that surrounds the core region 20. The outer cladding region 22 is characterized by a lower refractive index than the inner cladding region, as for the fibre in FIG. 1. The advantages of using non-circular symmetric shape of the inner cladding have been described in the background of the invention. Additionally, the shape of the inner cladding region and the incorporation of stress-applying features in the inner cladding feature may be utilized to achieve birefringence in double clad fibres, such as for example for polarization maintaining applications (see U.S. Pat. No. 5,949,941 for examples of such fibres). FIG. 3 shows another example of a prior art fibre having non-circular shape of the inner cladding 31.

When optimising cladding pumped fibres and fibre devices, a first important issue to address is the realization of a large index contrast between the inner cladding region and its outwards surroundings. This is important in order to have a high numerical aperture, NA, of the inner cladding such that efficient coupling from a pump laser to the cladding modes may be achieved. Typically, the numerical aperture of pump lasers, such as for example multi-mode solid state lasers, is significant larger than 0.2. Hence, it is desired to realise fibre designs having an inner cladding region with a NA larger than 0.2 at the pump wavelength. Secondly, it is important to match the field distribution, both in spatial size and shape, of the cladding modes to the pump fibre modes. Thirdly, it is important that the fibre has an efficient transfer of energy from cladding modes to the core.

Figure 4:
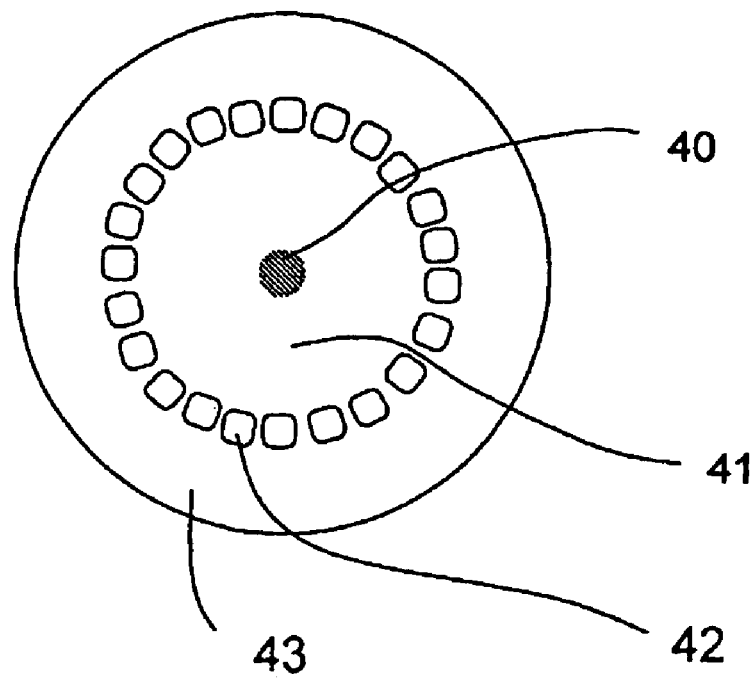
FIG. 4 shows an example of a double-clad fibre according to prior art, in which the first outer cladding is substantially an air-clad region.

An example of a prior art double clad fibre having a potentially large NA of the inner cladding 41 is illustrated in FIG. 4. This fibre is a so-called air-clad fibre that is characterized by the outer cladding being divided in two regions; a first outer cladding region comprising a number of low-index features (typically air holes) 42 and a second outer cladding region 43 surrounding the first outer cladding region and mainly acting as an overcladding layer that provides mechanical support and stability of the fibre. In U.S. Pat. No. 5,907,652, DiGiovanni et al. describe this type of air-clad fibre. DiGiovanni et al. point out that it is an advantage to use air holes in order to achieve a low effective refractive index of the first outer cladding region.

DiGiovanni et al. state that the effective refractive index is determined by the air-filling fraction and in order to improve the fibre the air filling fraction should be as large as possible. In preferred embodiments, the fibre of DiGiovanni et al. therefore have more than 50% air filling fraction, and further preferred embodiments have more than 75% of air in the air clad layer (referred to as a "web"). Generally, it is well understood that the effective index of microstructures may be lower by increasing the air filling fraction (or fraction of low index features), it therefore appears a straight-forward improvement to increase the air filling fraction in the fibres presented by DiGiovanni et al. (equivalent to increasing the air filling fraction, DiGiovanni et al. state that the amount of high index material (typically silica is the background material of the "web") in the air clad region should be reduced—preferably below 50% or further below 25%).

Figure 5A:
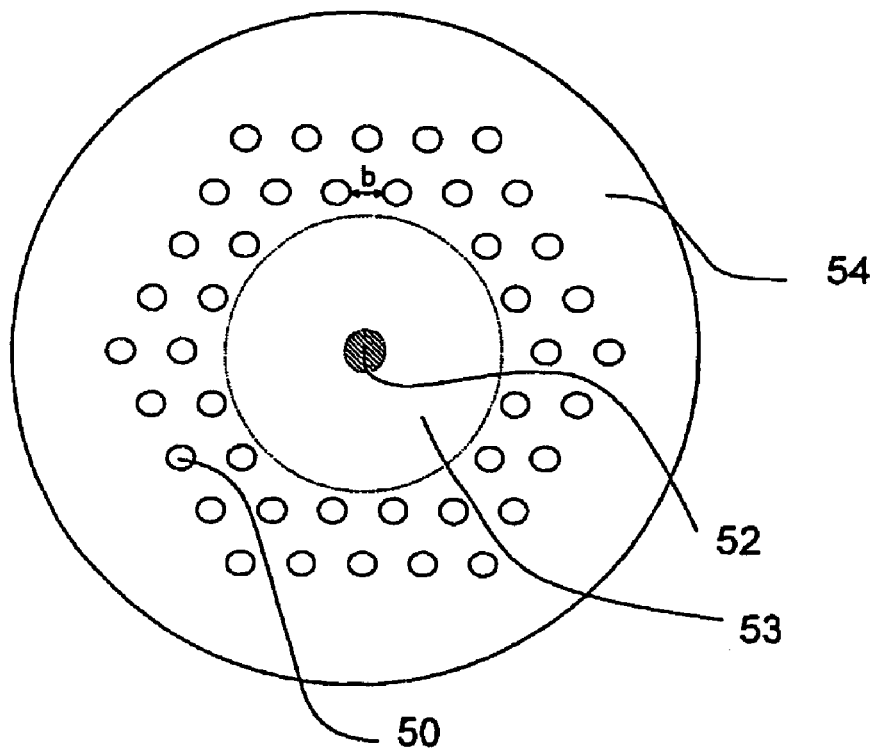
FIG. 5 illustrates the silica bridging regions that exists around the interface of the inner and outer cladding. A minimum width of a bridging region is defined.
Figure 5B:
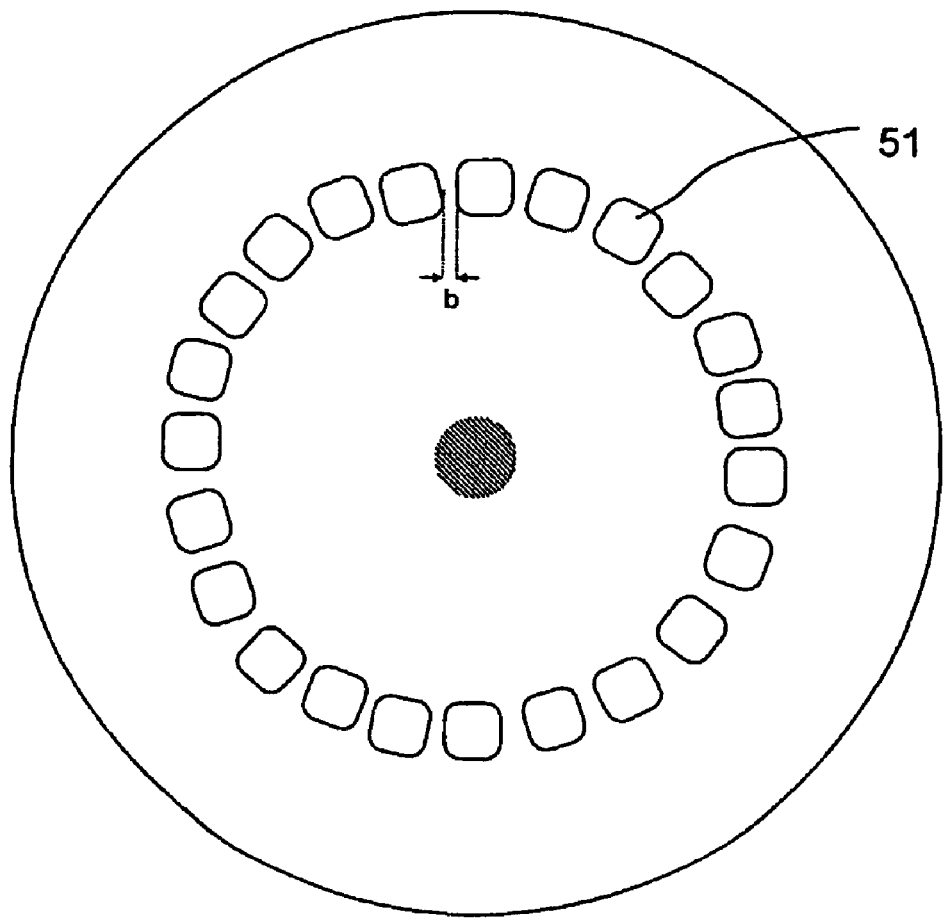

By using a detailed theoretical analysis of the NA of the air-clad fibres, it turns out that the statement presented by DiGiovanni et al. regarding improvements of air-clad fibre is too simple and focuses only on the air-filling fraction. In fact, it turns out that a large air-filling fraction in certain cases is no advantage to cladding pumped fibres. On the other hand, it surprisingly turns out that the width of high index material in the first outer cladding region is an important parameter for optimising air-clad fibre and which parameter can be tuned with respect to the optical wavelength of the light guided through the optical fibre. Looking at the cross-section of an air-clad fibre, the parameter in question is the thickness of the threads in the "web" which threads are comprised in the air-clad layer. More specifically, the parameter, labelled b, is "the smallest width of high index material in the first outer cladding region" as illustrated in FIG. 5 for two different air-clad fibres. In FIGS. 5a and 5b, both fibres have a core region 52, an inner cladding region 53, a first outer cladding region that comprises low-index features 50 and 51, respectively, and a second outer cladding region 54. The parameter b is indicated for both fibres. The parameter, b, may also be seen as the distance between two features meaning the minimum distance between edges of two neighbouring low-index features. In the case of periodically distributed low-index features in the first outer cladding, such as indicated in FIG. 5a, it should be clear that b is independent of which two low-index features are used to define b. On the other hand, in the case of non-periodic low-index features—or air-clad structure with some structural fluctuations that often occur due to fabrication—b will not be uniform throughout the first outer cladding—see FIG. 5b. In this latter case, the invention will relate to typical representative values of b, a plurality of the possible b's, a majority of b's or all b's.

A theoretical tool for analysing air-clad fibres is a full-vector numerical computer program that has been extensively tested and is well described in literature (see Johnson et al., Optics Express 8, no. 3, 173-190 (2001)).

Figure 6:
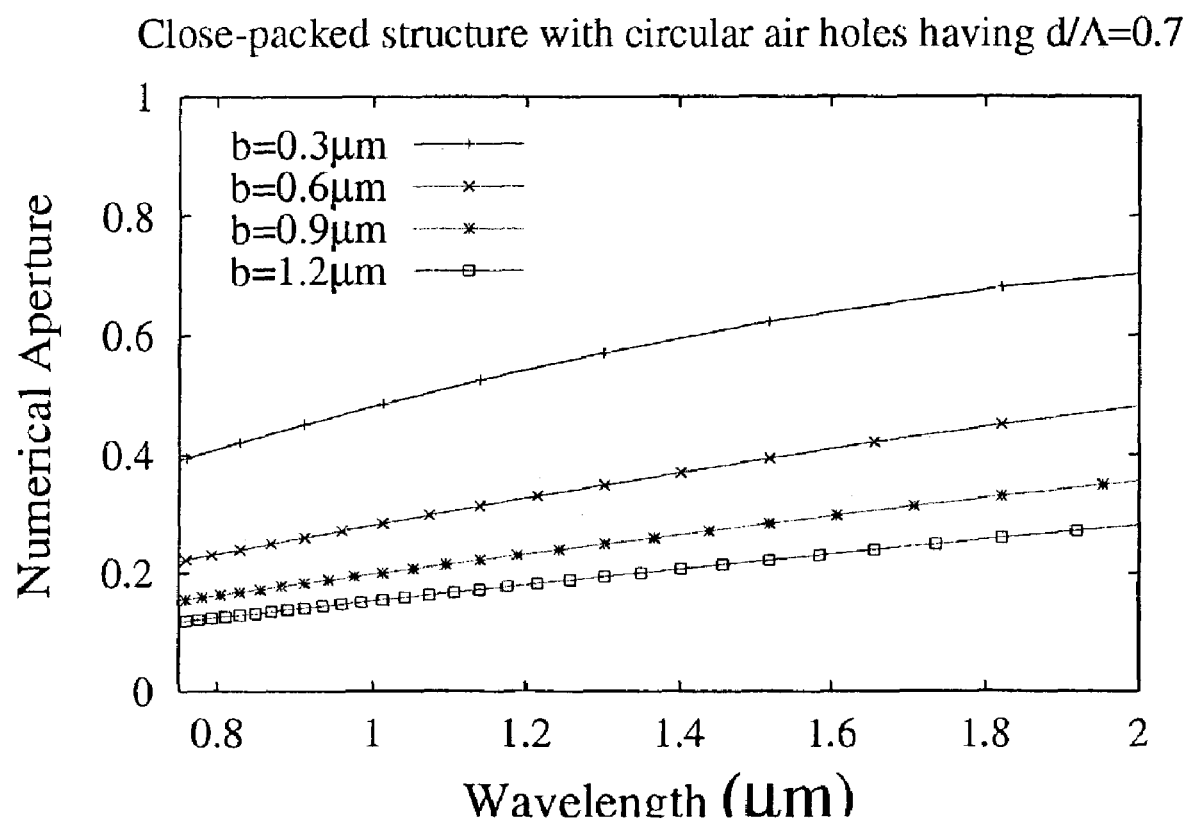
FIG. 6 illustrates the numerical aperture of air-clad fibres having a fixed air filling fraction of about 45%, but various widths of the bridging region.

In order to understand the findings of the present inventors, FIG. 6 shows the NA relating to the cladding modes for an air-clad fibre with a design as schematically shown in FIG. 5a. The fibre has a moderate air-filling fraction in the first outer cladding region of about 45% (hence below that of the stated preferred embodiments of the air-clad fibres by DiGiovanni et al. in U.S. Pat. No. 5,907,652). Looking at FIG. 6, it is seen that by tuning the parameter b, to 0.6, μm or lower, it is possible to achieve NA of more than 0.2 over a wavelength range λ larger than from about 0.8 μm to 2.0 μm. Typically preferred pump wavelengths for Erbium doped fibre amplifiers and laser are about 0.98 μm and about 1.48 μm. For fibre amplifiers and lasers with other rare-earth dopants, such as for example Yb, preferred pumping wavelengths are about 1.06 μm. From FIG. 6, it is also found that larger dimensions of b than 0.6 μm are not an advantage when the air filling fraction is limited to about 45%. Hence, the air-filling fraction alone is not a sufficient parameter to adjust when optimising an air-clad fibre to have a large NA.

Figure 7:
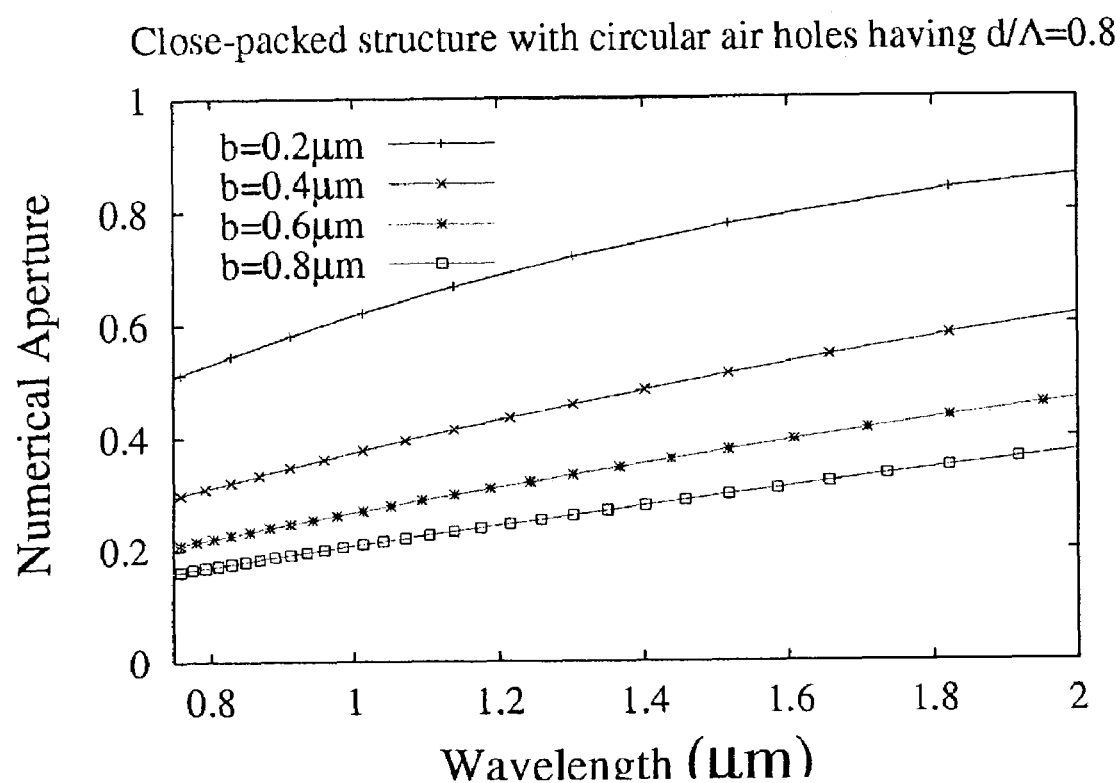
FIG. 7 illustrates the numerical aperture of air-clad fibres having a fixed air filling fraction of about 58%, but various widths of the bridging region.

Looking at a similar air-clad fibre as in FIG. 6, but having a larger air-filling fraction of the first outer cladding, namely about 58%, it is again found that the parameter b plays an important role when optimising the NA—see FIG. 7. For the important wavelength range of about 0.98 μm to 2.0 μm, it is found that to have an NA of more than 0.2, the b parameter has to be smaller than 0.8 μm. As previously stated, a large air-filling fraction may not necessarily provide a high NA. This is seen from FIG. 7 where the NA is lower than 0.2 for b larger than 0.8 times the optical wavelength. On the other hand, the same air-filling fraction may provide a very high NA—of more than 0.5—if b is smaller than 0.2 times the optical wavelength (we refer only to the free-space optical wavelength in the present invention). Also it is seen that NA of higher than 0.3 may be achieved for b smaller than 0.4 times the optical wavelength.

While FIG. 6 and FIG. 7 address only two different air filling fractions, it turns out that to have a NA of about 0.2 or larger, it is required that b is not larger than the optical wavelength of light guided through the fibre. Hence, for pumping about 0.98 μm, it is required that b is smaller than 1.0 μm.

With the teachings of DiGiovanni et al, it may appear surprising that the parameter b plays such an important role regarding the NA of air clad fibres. Following the teachings of DiGiovanni et al., it may be even more surprising to see that the same NA may actually be achieve for two fibres with different air filling fractions, but similar value of the b parameter. This is, however, what the present inventors have found—as may be seen from FIG. 8. The figure shows the NA of a fibre with an air filling fraction of about 58% and b of 0.2 μm (top curve). Further, the figure compares the NA of two fibres with similar b value of 0.3 μm, but different air filling fractions of about 45% and of about 58% (curves labelled d/Λ=0.7 and d/Λ=0.8, respectively). From these two curves it is found that despite the different air-filling fraction, the NA of the two fibres is almost identical over the broad wavelength range from about 0.8 μm to 2.0 μm. This result further shows the importance of the b parameter regarding the NA of the air clad fibres and how focusing alone on the air filling fraction for the optimisation of the fibres is a too simple approach. To demonstrate that the NA is not only by chance coinciding for the fibres having b=0.3 μm, FIG. 8 furthermore shows that this is also the case for fibres with b=0.4 μm.

As seen from FIG. 6 to 8, the NA of the fibres is decreasing at shorter wavelengths. This decrease is related to the larger bridging width relative to the optical wavelength. It turns out that it is a further advantage that the bridging material has a lower refractive index than the background material of the inner cladding region. For a given desired NA of a fibre, this allows an increase of bridging width, or alternatively for a given desired bridging width, it allows a higher NA to be achieved. These aspects allowing increased bridging width for a given NA, may prove advantageous for issues relating to mechanical robustness and handling of the fibres, such as for example cleaving and splicing—as shall be discussed at a later stage of the present application. Therefore, in preferred embodiments, the air-clad layer comprises low-index features placed in a background material having a refractive index being at least 0.5% lower than a refractive index of the background refractive index of the inner cladding region. Preferably, the index difference is larger, such as larger than 1%, or 2%, or larger. Such differences may well be achieved using silica-doping techniques by for example using F-doped silica glass for the background material of the air-clad layer and/or using Ge-doped glass for the background material of the inner cladding region. Using other types of glasses—such as non-silica glasses—even larger index differences may be achieved. Therefore, in further preferred embodiments, the afore-mentioned index difference is larger than 5%, or larger than 10%. For index difference of about 10% or less, typically the increase in bridging width that can be obtained is relatively small for fibres having NA of about 0.5 or larger. Hence, in preferred embodiments, the bridging widths are in the range of about 200 nm to 400 nm for fibres with NA of about 0.5 or larger.

Having focused on the air-clad region, it is naturally also important to notice that a microstructuring of the inner cladding region may influence the NA. In this respect, a large number of micro-structured, low-index features in the inner cladding region may degrade the NA of the cladding modes. Hence, fibre designs having a (large) number of large inner cladding features, as presented in the prior art, may not be advantageous (see previously mentioned Russell et al. reference under the background of the invention section). An example of such a fibre is shown in FIG. 9. An advantage of micro-structuring of the inner cladding region is, however, that the microstructuring may be used to tailor the mode field distribution in the inner cladding—or to scramble the cladding modes—to provide an improved overlap with a core mode. It turns out that to optimise air-clad fibre for cladding pumped applications, a relatively low number of inner cladding features should be employed—in order not to degrade severely the NA of the fibre. It may further be preferred to place these features in non-periodic manners. An example of a preferred embodiment of such a fibre according to the present invention is illustrated in FIG. 10. The fibre has a rare earth doped core 100 and an inner cladding region comprising a background material 102 and a low number—here 5—low-index features 101 that are non-periodically positioned. The low-index features in the inner cladding region may be of different size. Surrounding the inner cladding region is an outer cladding region 103. This outer cladding region may be a single outer region or may comprise a first, a second or more outer cladding regions.

Another embodiment is shown in FIG. 11. The shape of the inner cladding region 111 may also be non-circular using a non-circular arrangement of low-index features 112 in a first outer cladding region. The core 110 of this fibre is also shown. Another example of a preferred embodiment of the optical fibre according to the present invention is indicated in FIG. 12, here the core 120 is surrounded by an inner cladding region 121 that has a non-circular outer shape that has been achieved by using different-sized, low-index features 122, 123 in a first outer cladding region. FIG. 13 shows other examples of preferred embodiments of the optical fibres according to the present invention, where the core 130 is surrounded by an inner cladding region that comprises a background material 131 and low number of features 132 that are positioned close to the core 130 such that they may affect the waveguiding of the core mode. The fibre is further characterized by an outer air-clad region 133. Other variations of this type of fibre design is also shown in FIG. 13, including examples of preferred embodiments of the optical fibres according to the present invention where the core is made of the same material as the background material of the inner cladding, and the inner cladding features ensure the guidance of a single mode in the core. As a further note to FIG. 13, it should be mentioned that the presence of low-index features around the core may impair the coupling between inner cladding mode and the core, therefore it may be an advantage that the hole pattern is not circular symmetric in order to broaden a few "channels" from the outer part of the inner cladding to the core. This may further be used to create a strong birefringence in the fibres for polarization maintaining applications. It is further important to notice that the coupling between cladding modes and core mode(s) will be lower for long wavelengths compared to short wavelengths. Since a short pump wavelength compared to the signal wavelength is often used for cladding pumped fibre amplifiers and laser, the presence of low-index features close to the core may be advantageous for controlling the waveguidance of the (long wavelength) signal light, while the presence may be of little or none effect for transfer of energy from the (short wavelength) cladding modes to the core region—in other words, the presence do allow an efficient coupling from cladding modes to core mode.

In order to produce optical fibres according to the present invention, a technique well known for fabrication of microstructured fibres may be employed, see for example U.S. Pat. No. 5,907,652, or any of the afore-mentioned references. This method has been adapted to produce embodiments of the optical fibers according to the present invention. The method is based on stacking of capillary tubes and rods to form a preform and drawing this into fibre using a conventional drawing tower. The present invention also covers designs of preforms, and an example of a preform according to the present invention is illustrated in FIG. 14. The preform comprises a rare earth doped centre element 144 that will act as the core in the final fibre. More rods, tubes or a combination of these may also form the core region. Surrounding the core is a number of solid rods (typically undoped silica) 142, and a few tubes 143 placed in a non-periodic manner. These rods and tubes form the inner cladding region of the final fibre. The preform further comprises a region of capillary tubes 141 having a larger air-filling fraction compared to the tubes in the inner cladding region. Thereby a smaller thickness, $0.5\ b_{preform}$, of the tube wall is obtained. As the preform is reduced in size during drawing of the fiber, the smaller thickness of the tube walls for the tubes in the air clad region provides the b-parameter of the final fibre. These tubes will form the first outer cladding region—or the air clad region— of the final fibre. Finally, the fibre preform comprises a large overcladding tube 140 that will act as a second outer cladding region providing a desired outer diameter of the final fibre as well as mechanical robustness of the fibre.

The present invention also covers preforms with designs as shown schematically in FIG. 15. This type of preforms—and the optical fibres that may be drawn from them—is of importance for coupling from laser diode strips to cladding pumped optical fibres. Regarding high power laser diodes, the preferred pump sources for high power optical fibre amplifiers and lasers typically emit light from a section of dimensions from about 1 µm to several hundred µm. Optical fibres that match various geometries may easily be made by stacking capillaries 150 to form an air-clad region and rods 151, 152 to form an inner cladding region surrounding a core 153. Moreover, the high NA provided by the air-glass refractive index contrast makes it possible to guide all the pump light from the diode using direct butting, without having to resort to a lens to collimate the very diverging fast-axis. Preforms build from non-circular tube/rods are also possible, see examples of such elements 154, 155.

The present invention also covers optical fibres where the outer shape of the fibre changes along the optical fibre length. For example, as shown schematically in FIG. 16, the optical fibre 160 may be "circularised" in one end by heating up the fibre over part of its length. The fibre may in such a way be tailored for a specific mode profile in one end, such as a rectangular shape using rectangular placed features 161, and a circular shape using circular placed features 162 in the other end.

Hereby, the optical fibre may be adapted to a specific laser at the input end and the optical fibre may be adapted to exhibit a more symmetric output beam. The fibre may also be stretched in the same fabrication process to reduce the output spot-size.

As illustrated in FIG. 16, the fibre may also contain a core material that is identical to the inner cladding material— hence the core and inner cladding acting as one large multi-mode core.

Other embodiments according to the present invention may generally include microstructured optical fibres having large effective refractive index contrast between various regions in the cross-section, such as for example concentric, annular microstructured regions. Therefore, in another aspect, the present invention covers microstructured optical fibres having at least two microstructured cladding regions that are separated by at least one homogeneous region. An example of such a fibre is illustrated in FIG. 17, where the two microstructured regions are formed from low-index features 170 and 171. The microstructured regions each have b parameter smaller than 1.0 µm, such as smaller than 0.5 µm or smaller than 0.3 µm to provide a large effective index contrast between adjacent regions. The homogeneous region separating the two microstructured regions is indicated with numeral 172.

The present invention discloses how to realize high numerical aperture in optical fibres with an air-clad layer. High numerical aperture is not only of interest for cladding pumped optical fibre lasers and amplifiers, and the present invention also includes other optical fibre applications, where narrow bridges are used to obtain high numerical aperture. As an example, the present invention also covers multimode optical fibres, where the core region does not contain rare-earth elements, and even multimode optical fibres where the core does not contain any doping elements at all. Compared to the previously discussed examples of preferred embodiments of the present invention, a multi-mode optical fibre according to the present invention may have a core that is identical to the inner cladding. Hence, the present invention covers optical fibres with an air-clad region having narrow bridging regions, where the air-clad region surrounds a large core of homogeneous material—for example pure silica. Naturally, the core may also comprise doped silica glass to realize a special refractive index profile, such as for example a parabolic refractive index profile in the core. An example of a multi-mode optical fibre with a high numerical aperture is schematically illustrated in FIG. 18. The optical fibre has a large core region 180 with a diameter of more than 10 µm, such as larger than 25 µm. Surrounding the core region 180 is an air-clad layer comprising air holes 181 and, outside the air-clad layer is a homogeneous cladding layer 182 providing mechanical robustness to the fibres. It is required that the bridging width between the air holes 181 is narrow—smaller than 1.0 µm, and preferably smaller than 0.5 µm—in order for the optical fibre to have a high numerical aperture—larger than 0.5, and preferably larger than 0.7.

A multimode optical fibre as the one disclosed above, may for example be employed for high power delivery. As an example, a multimode fibre may be used as delivery medium for pump sources to various types of lasers and laser components. Typical for such a (passive) delivery optical fibre, it is advantageous to have a high NA at both optical fibre ends, or only at a single of the optical fibre ends, such as a high NA at an input-end and a lower NA at an output-end, or vice versa. For example, as illustrated in FIG. 19a, at an input-end 190 the air-clad layer 191 may be designed with narrow bridging regions for providing an NA of more than 0.5, and at an output-end 192 a lower NA may be desired (for example below 0.3)—for mode matching to a standard fibre or a specific laser component—and the holes in the air-clad layer may be partly or fully collapsed. This may either be performed over the full fibre length, or parts thereof, or directly at the end-facet of the output end of the fibre. Such a difference in NA between two ends of an optical fibre, may also be relevant for active fibres comprising a doped core region 195, 197, see FIG. 19b. For example for a cladding pumped fibre laser, where the input-end 194 has a high NA for efficient coupling of pump light (commonly from a solid state laser source). At the output-end 196 of such a fibre laser, where the pump light may be absorbed to a large degree, the main power carried by the fibre will be at the signal wavelength in the core region. Therefore, at the output-end, the air clad layer plays little or no effect and the voids may be fully or partially collapsed.

Optical fibres according to the present invention will often comprise Bragg gratings along a part of their length, for example for realization of optical fibre lasers. These Bragg gratings may be introduced by UV-writing of refractive index changes in the longitudinal direction of the optical fibres.

An example of a preferred embodiment of an optical fibre according to the present invention that may be used for fibre laser applications is shown in FIG. 20. The figure shows schematically the cross-section of a fibre that contains an active core region 200, typically realised by doping of one or more rare-earth elements, such as for example Yb or Er. Surrounding the core region is an inner cladding comprising a background material 201 and a number of high- and/or low-index features 202. Surrounding the inner cladding region is an air-clad layer 203 that finally is surrounded by an overcladding region 204. Such a fibre, may for example be designed in silica materials, with the inner cladding features 202 being voids. In a preferred embodiment, the optical fibre is used as a large-mode area, cladding pumped optical fibre laser for high-power applications. Using low-index features in the inner cladding with a diameter of about 0.30 to 0.50 times an average, typical or representative centre-to-centre spacing, $\Lambda$, between the inner cladding features, single-mode operation at a signal wavelength, $\lambda_s$, may be obtained in the core region, whereas the core as well as the inner cladding region may be pumped with a pump light at a wavelength, $\lambda_p$, being smaller than $\lambda_s$. Typical values of $\lambda_p$ are about 800 nm, 980 nm, 1050 nm, and 1480 nm and typical values of $\lambda_s$ are about 980 nm, 1050 nm, 1300 nm, 1550 nm, such as from 1500 nm to 1640 nm. Even in the case of a significant number and size of the inner cladding features, a high NA may be obtained using an air-clad layer when b values are in the range from 100 nm to 1000 nm (preferably smaller than 400 nm)—as previously described. Typically, the core region 200 will comprise one or more index-raising dopants (that are introduced to improve incorporation of rare-earths into silica). It may therefore be preferred to fabricate the optical fibre using a background material 201 having a refractive index above that of pure silica, such as larger than 1.444 at a wavelength of 1.55 µm. This may for example be obtained by having a background material 201 comprising Ge and/or Al. The core region may also comprise one or more co-dopants (apart from one or more (active) rare-earth dopants and any optional index-raising co-dopants) that decrease the refractive index, such as for example F and/or B. Regarding dimensions of a fibre, such as the one, shown in FIG. 20, typically the inner cladding region will have an outer diameter of about 60 µm-100 µm, for fibres with an outer diameter of about 125 µm of the outer cladding region 204. For fibres having a larger outer diameter, the inner cladding may have an outer diameter up to 200 µm. Typically, the inner cladding features will be characterized by a typical centre-to-centre spacing, $\Lambda$, of more than 5 µm, and typically about 10 µm, such as in the range from 8.0 µm to 12.0 µm. In order to avoid bending losses, but to maintain the fibre single mode in the core region at the signal wavelength, the inner cladding features will typically have a diameter in the range from 0.3 $\Lambda$ to 0.6 $\Lambda^-$ The fibre may be employed as part of an article being a fibre laser, where the article comprises one or more pump sources and external reflectors or the reflectors are formed directly in the fibre using one or more UV-induced Bragg gratings.

Optical fibres according to the present invention that are used for laser or amplifier applications may be pumped in various ways known from standard fibre technology, such as end- and side-pumping.

FIG. 21 shows an optical microscope photograph of a preferred embodiment of an optical fibre according to the present invention that has been fabricated. The fibre has NA of about 0.6 at wavelength about 1.0 µm. This high NA is obtained by the use of very narrow bridging regions in the air-clad region. The specific fibre has a b-value of about 400 nm. A number of fibres with different b-values have also been fabricated and experimental characterizations have confirmed that optical fibres with b-values in the range from about 100 nm to 500 nm provide NA of more than 0.5, typically more than 0.6.

From experimental work, it turns out that it may be of practical relevance that the b-value of a real optical fibre is larger than a certain size. This is for example the case in relation to cleaving and/or for splicing of the fibres. Typically, it is preferred that the b-value is not smaller than 100 nm, such as a b-value of not smaller than 200 nm may be preferred.

The present inventors have further realized another design parameter that is of practical importance for fibres having an air-clad layer. Through experimental work, the present inventors have realized that the thickness, T, of the air-clad layer 223 plays an important role mechanically for cleaving of the fibres. The T-parameter is indicated in FIG. 22, for a fibre with a doped core region 220, an inner cladding region 221, an air-clad region 223 and an outer cladding region 222. As cleaving is usually performed by introducing some kind of scratch to the outer surface of the fibre, and having this scratch developing into a crack going through the fibre, it may be a disadvantage if the air-clad layer has a too large thickness, T, such that the inner cladding region becomes mechanically isolated from the outer cladding. On the other hand, the thickness, T, has to be of a certain size in order to optically isolate the inner 221 and outer cladding 222. The present inventors have realized that an optimum thickness of the air-clad layer 223 is in the range from about 3.0 µm to about 10 µm. Since fibres according to the present invention may also be used for applications where the air-clad layer after fibre fabrication is filled by e.g. polymers and/or other materials, other thickness values may be of interest in order to obtain a given volume. Hence, air-clad layers with thickness larger than 10 µm may also be of relevance.

FIG. 23 shows another example of a real fibre according to the present invention. FIG. 23a shows the core, the inner cladding region, the air-clad layer and part of the outer cladding (the core comprises Yb-doped silica that does not show different than the pure silica of the inner cladding in the microscope picture). The fibre has a b-value of about 300 nm and a NA of about 0.7 at wavelengths about 1.0 µm. The optical fibre has a larger T-value than the fibre in FIG. 21, and the fibre showed more difficult to cleave in agreement with the above-described relation between T-value and cleaveability.

FIG. 24 shows schematically another example of a fibre according to the present invention, which fibre may be used in endoscopes. The fibre comprises an overcladding 240 and large number (typically more than 100) of core elements 241 that are typically multi-mode and passive. The core elements are separated from each other using air-clad layers (or other types of low index layers) that provide a high NA for the individual cores. In this manner, the fibre according to the present invention is capable of collecting a large amount of light due to the high NA of the individual cores—and these individual cores may be used as pixels for image transfer through the fibre endoscope. To obtain the high NA, the air-clad layer is characterized with narrow bridging widths—as described throughout this patent application. Typically, the diameter of the individual cores is about 10 µm or larger.

FIG. 25 shows another example of a fibre according to the present invention. The fibre resembles the fibre schematically shown in FIG. 20—having a high NA air-clad layer 253 as disclosed in the present application. The fibre, however, comprises a multitude of cores 250, 251 (such as for example 7, 19, or 37) that are positioned such that a distance from a centre of a core to a centre of its nearest neighbouring core is similar for all cores in the fibre. This type of fibre may be used as a high-brightness laser in a similar manner as described by Cheo et al. in IEEE Photonics Technology Letters, Vol. 13, no. 5, pp. 439-441, May 2001. The fibre optionally comprises a number of features 252 in the inner cladding region.

FIG. 26 shows yet another example of a fibre according to the present invention. The fibre comprises a high NA air-clad layer 263 according to a main aspect of the present invention and a multitude of cores 262 in an annular arrangement inside the air-clad layer. Other arrangements; such as for example a polygonal-shaped arrangement may also be preferred. The fibre further comprises a conventional overcladding region 264. The fibre may be used as a cladding-pumped device, where the pump light is propagating inside the core arrangement. This type of core arrangement may be preferred for example for improved coupling efficiency as described by Glas et al. Opt. Comm. 151, pp. 187-195, 1998.

The present inventors have further realized that an improved type of cladding pumped erbium-doped fibre amplifiers (EDFAs) may be obtained through the use of the PBG effect for confining the core mode inside the fibre. Generally, when optical fields are confined through the use of the PBG effect, at least 4-5 periods of the periodically distributed cladding holes need to be used. As optical cladding pumped fibres may have relative large inner cladding regions a sufficient number of periods may well be included for confinement of the core mode. The advantages of using PBG confinement are secured. A first aspect is that the PBG structuring at the wavelength of the amplified mode may work as a mode-scrambling structure of air-holes at the wavelength of the pump mode field, but without confining the pump distribution to the limited center part of the PCF. Hence, in preferred embodiments, the present invention comprises air-clad fibres having periodically distributed features in the inner cladding region that provide waveguidance by PBG effect of light at signal wavelength.

FIG. 27 shows an example of an optical fibre according to the present invention that comprises an air-clad layer 270 for providing a high NA, and a number of periodically distributed features 271 in the inner cladding. The fibre further comprises a low-index feature 272 in the core. The feature 272 may for example be a void or down-doped silica glass. The features may optionally comprise active material, such as a rare-earth-doped (RED) material, that provides amplification for optical amplification or lasing. The fibre may also optionally comprise an active material in a region surrounding the feature 272.

Furthermore, we may obtain a better power conversion from pump to signal because different overlap between RED material signal mode, and cladding pump distribution may be obtained. In a further aspect, the PBG guidance may be used to obtain high-power output from lasers and amplifiers operating in a higher-order mode (a non-gaussian mode distribution). This is possible because the PBG structure may be designed such that the core mode will only guide in a higher-order mode and all other modes will be leaky because they are placed outside the bandgap. The PBG guidance for the amplified mode may also find relevant use in applications where amplifiers with special dispersion properties are needed (for pulse spreading or pulse compression).

In yet a further aspect, the PBG guidance may be used to enhance specific parts of the amplifier spectrum. Here, we may place the bandgap edge at a frequency within the emission spectrum of the rare-earth ion. For the part of the RED-emission spectrum which is inside the bandgap, the core mode is well confined, whereas the spectral components which are outside the bandgap are less well confined, and consequently, the two ranges undergo different amplification. This property may be used to spectrally shape new high-power amplifiers and to fabricate lasers with special emission wavelengths, through the strong mode selection/discrimination made possible by the PBG effect. A schematic illustration of this aspect is presented in FIG. 28.

Fibres according to the present invention may be fabricated using techniques that are well known in the area of microstructured fibres. For example, the air-clad layer and optional features in the inner cladding region may be realised using a stack- and draw method that employs capillary tubes and rods. This method has been well described in literature, see e.g. U.S. Pat. No. 5,907,652 and U.S. Pat. No. 5,802,236. Fibres according to the present invention that are non-uniform in the longitudinal direction, may be realized using various types of post-processing steps after fibre drawing, such as heat-treatment, stretching, pressurizing or vacuum-treatment of the voids in the fibres, introduction of materials into the voids or combinations of these steps.

Specifically for fabricating fibres such as the fibre in FIG. 24, it may be advantageous to draw the fibre in multiple steps, where a single core and its surrounding air-clad layer is fabricated by in a first step assembling a preform comprising a single solid rod surrounded by a layer of tubes of smaller diameter than the rod. This preform having a diameter of typically 10 mm to 50 mm may be drawn into a number of first canes—typically of diameter 1 mm to 5 mm. A second preform may then be fabricated by stacking a number of first canes together and this preform may optionally be overcladded and drawn directly into fibre, or the second preform may be drawn to a number of second canes that again may be stacked together and overcladded to form a third preform that may be drawn into fibre.

Figure 29A:
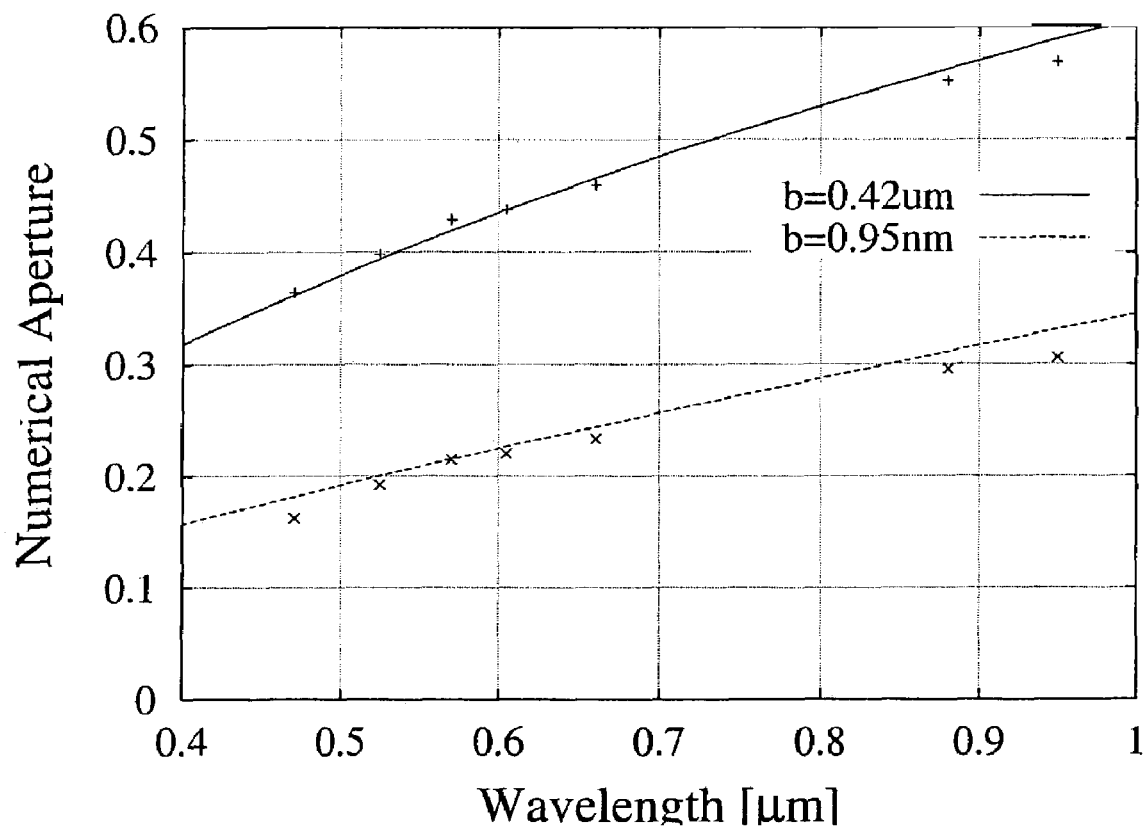
Figure 29B:
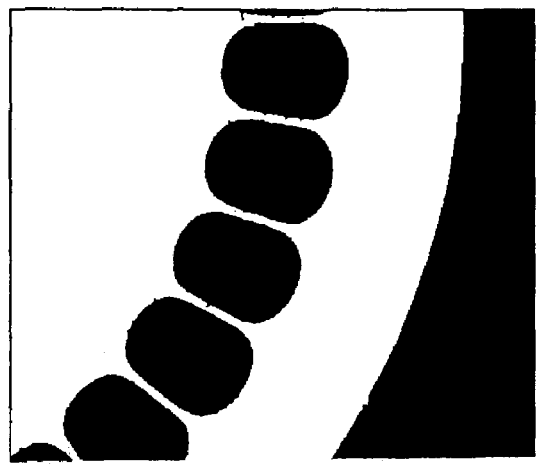

FIG. 29a shows experimental results of measured NA for two different air-clad fibres. Each of the fibres has an air-clad region with a design as shown schematically in FIG. 5b, but the fibres have different b-values of 420 nm and 950 nm. In the figure, measured NA values are indicated by points, whereas the lines indicated simulated NA of the fibres. A very good agreement for the fibres is observed. The figure shows that the NA of the fibre with bridging regions of minimum width, b, of about 420 nm is significantly higher than for the fibre with b of about 950 nm. A microscope picture of a part of the fibre with b=420 nm is shown in FIG. 29b. The air-clad layer comprises a single ring of air holes and preferably the width of the air holes in radial direction from the centre of the fibre is in the range of 5 μm to 15 μm. It is here desired to keep the radial width—and thereby the bridging regions—long enough to ensure the optical properties in terms of high NA, while the radial width is short enough to ensure good mechanical properties in terms of cleaving of the fibre and/or handling strength. Further issues to consider for the width, may be heat transfer from the inner parts of the fibre to the outside. For high power applications, it may be desirable to have a limited radial width of the air-clad region in order to avoid thermal isolation. Accordingly, it may be preferred to have a high number of bridging regions equivalently a high number of low-index features in the outer cladding—to provide sufficient heat transfer. In preferred embodiments, a smallest cross-sectional distance from two neighbouring bridging regions is, therefore, kept above a first size to ensure optical isolation (typically a distance of about three to five times an operating wavelength is sufficient to ensure isolation of the individual bridges), while at the same time being lower than a second size to ensure a sufficiently large number of bridges (for example a second size of about ten times an operating wavelength). Other first and second sizes may, however, be preferred. Typically, the range of the second size may vary significantly, such that a second size of several tens times an operational wavelength may be preferred.

FIG. 29a further shows how the NA is varying with wavelength. The present inventors have realized that the NA and its variation are primarily determined by the wavelength relative to the b-parameter. To demonstrate this in more detail, FIG. 30 shows the NA as a function of wavelength divided by b for both experimentally obtained results and simulations. As for FIG. 29, the results in FIG. 30 are for a fibre solely comprising pure silica and air holes in the air-clad region. The figure shows a very clear relation between NA and wavelength divided by b, $\lambda/b$—and the experimentally observed results are confirmed by numerical simulations. Hence, FIG. 30 may be used to design fibres with a certain NA at a given wavelength. From FIG. 30 it is found that in order to obtain an NA of about 0.3 or higher, b should be smaller than $\lambda$. For an NA of about 0.4 or higher, b should be smaller than approximately $0.8\lambda$, and for NA higher than 0.5, b should be smaller than approximately $0.6\lambda$ and for NA higher than 0.6, b should be smaller than approximately $0.45\lambda$ The figure also illustrates that extremely higher NA of more than 0.7 is feasible using b of smaller than approximately $0.3\lambda$. Hence, for an applications where a fibre according to the present invention is used as a cladding pumped device (for example a laser or an amplifier) with a pumping wavelength of about 980 nm and a NA of about 0.5 is desired, b should be designed to be about or smaller than 560 nm.

For various applications, it may be desired to obtain the largest possible bridging regions for a given NA. This may for example be for improved mechanical properties such as for fibre strength or cleaving, or it may be for improved heat transfer as discussed previously. In order to increase the bridging width for a given NA, the present inventors have realised that it is an advantage to have an index difference, $\Delta_{clad}$, between the material of the bridging regions and the background material of the inner cladding. FIG. 31 shows schematically an example of an improved fibre according to the present invention, where the outer cladding region comprises a background material 310 having a lower refractive index than the refractive index of the background material 311 in the inner cladding region. This index difference may for example be realised using silica-doping techniques, where the inner cladding region comprises Ge-doped silica glass and the outer cladding region comprises un-doped silica glass. Naturally, other manners of realising this index difference may be thought of, for example using F-doped glass in the outer cladding as Flour decreases the refractive index compared to pure silica. The index difference, $\Delta_{clad}$, is also schematically illustrated in FIG. 32 that shows a schematic example of the refractive index profile in one direction through the cross-section of a fibre according the present invention. While FIG. 30 showed the NA as a function of $\lambda/b$ for no index difference between the refractive index of the background material in the inner and outer cladding, $\Delta_{clad}=0\%$, FIG. 33 shows how the NA may be increased by increasing $\Delta_{clad}$. The figure shows simulations of the NA for silica-based fibres where $\Delta_{clad}$ is varied from 0% to 4%. As seen from the figure, a significant increase in NA may be realised using non-zero $\Delta_{clad}$. As an example, the previously discussed fibre device operating at a pump wavelength of 980 nm and an NA of 0.5, a b-value of about 650 nm may be realised as compared to b=560 nm for the fibre with $\Delta_{clad}=0\%$ (NA of 0.5 occurs for $\lambda/b$ of about 1.50 and 1.75 for $\Delta_{clad}=1\%$ and 0%; respectively). As another example, fibres with an NA of about 0.5 may be realized for b of about $\lambda$ for $\Delta_{clad}$ about 3%. Further, fibres with NA of higher than 0.8 may be realised for $\lambda/b$ of about 3.0 or larger. The ideas of increasing the NA using non-zero $\Delta_{clad}$, may be utilized for all types of high NA fibres comprising low-index features 314, 324 in the outer cladding region and is not limited to the two example shown in FIGS. 31 and 32 having an active core 313, 320 and inner cladding features 312, 322 in the inner cladding region 321. Optionally, the overcladding region 315, 325 may comprise a background material being different than the background material 310. While it is the refractive index difference between the material in the bridging regions and the background material in the inner cladding that provides the improved NA properties, the radial width of the outer cladding comprising a low-index background material 317 may not be critical. It may be preferred that the radial width 317 is larger than the radial width of a low-index feature in the outer cladding 316. Such a relation could occur for a fibre being fabricated using the stack and pull process (as described for example in U.S. Pat. No. 5,907,652) where the outer cladding region is realised using silica capillary tubes having a lower refractive index than the rod for realising the inner cladding region (and the core). The inner cladding region and the core may naturally also be fabricated by various combinations of tubes and/or rods.

A further advantage of using a non-zero $\Delta_{clad}$ relates to cladding pumped fibres having a large active core. FIG. 32 shows the index difference, $\Delta_{core}$, between an active core 320 and the background material of the inner cladding 321. In a preferred embodiment, the fibre uses inner cladding features 322 to confine light in the core—either using modified total internal reflection (M-TIR) as for example described in WO 9900685 or using PBG effects as previously described. In the case of M-TIR, it is preferred that the index difference, $\Delta_{core}$, is as low as possible to avoid multimode operation at the signal wavelength for large core sizes. In preferred embodiments, $\Delta_{core}$ is about zero and in other preferred embodiments, $\Delta_{core}$ may be negative. A low (or negative) $\Delta_{core}$ allows use of very large active cores of more than 15 μm in diameter while single mode operation for at least the signal wavelength is obtained. As dopants for realizing active cores (such as for example Er, Yb, or other rare earth elements or combinations of these) and optional co-dopants (such as for example Al, Ge, and/or La) may increase the refractive index compared to pure silica, it is preferred to use a background material in the inner cladding region with a raised refractive index—for example using Ge-doped silica. While this may provide □core of about zero, a $\Delta_{clad}$ value above zero may be obtained at the same time. Hence, in a preferred embodiment, the present invention provides an optical fibre laser or amplifier for visible or near-infrared wavelengths comprising an active core comprising Er and/or Yb having a diameter of more than 15 μm, and inner cladding region comprising a Ge-doped silica background material and number of voids having d/Λ of about 0.35 or larger (providing M-TIR in the core for the signal), and an air-clad region comprising a background material (for example pure silica) with a refractive index being lower than that of the inner cladding background material and large voids providing a b-value of less than 1.0 μm, preferably less ⅔ times a free-space pump wavelength (thereby realising an NA of about 0.5 or higher).

The invention claimed is:

1. A cladding pumped optical fibre having a longitudinal direction and a cross-section perpendicular thereto, the cladding pumped optical fibre comprising:
   (a) at least one core having an effective refractive index and comprising at least one rare earth element;
   (b) a cladding region, said cladding region comprising:
      an inner cladding region surrounding said core and having an effective refractive index with a lower value than the effective refractive index of said core, said inner cladding region being configured to guide pump light for transfer of energy from cladding modes in said inner cladding to mode(s) of said core;
      an outer cladding surrounding said inner cladding region, said outer cladding having:
      (i) at least one first outer cladding region, said first outer cladding region comprising a first outer cladding background material and a plurality of first outer cladding features, said first outer cladding features having a lower refractive index than said first outer cladding background material, said first outer cladding region having an effective refractive index with a lower value than the effective refractive index of the inner cladding; and
      (ii) at least one second outer cladding region, comprising a second outer cladding background material, and surrounding said first outer cladding region,
   wherein for a plurality of said first outer cladding features, two nearest neighbouring first outer cladding features have a minimum distance from each other that is smaller than 0.6 μm.

2. The cladding pumped optical fibre according to claim 1, wherein the inner diameter or inner cross-sectional dimension of the first outer cladding region is larger than or equal to 20 μm.

3. The cladding pumped optical fibre according to claim 1, wherein for a plurality of said first outer cladding features, the minimum distance b between two nearest neighbouring outer cladding features is smaller than 0.5 μm.

4. The cladding pumped optical fibre according to claim 1, guiding at least two predetermined wavelengths wherein for a plurality of said first outer cladding features, the minimum distance b between two nearest neighbouring first outer cladding features is smaller than a shortest optical wavelength of light guided through the fibre.

5. The cladding pumped optical fibre according to claim 1, wherein the first outer cladding features are voids.

6. The cladding pumped optical fibre according to claim 1, wherein the first outer cladding features are filled with a vacuum, air, a gas, a liquid or a polymer or a combination thereof.

7. The cladding pumped optical fibre according to claim 1, wherein the core comprises at least one member of the group consisting of Ge, Al, P, Sn and B.

8. The cladding pumped optical fibre according to claim 1, wherein the fibre has a long period grating or a fibre Bragg grating along at least part of the fibre length.

9. The cladding pumped optical fibre according to claim 1, wherein the fibre comprises a background material selected from the group of glass, polymer or combinations thereof.

10. The cladding pumped optical fibre according to claim 1, wherein for a majority of said first outer cladding features, the minimum distance between two nearest neighbouring outer cladding features is smaller than 0.6 μm.

11. The cladding pumped optical fibre according to claim 1, wherein for a majority of said first outer cladding features, the minimum distance between two nearest neighbouring outer cladding features is smaller than 0.5 μm.

12. The cladding pumped optical fibre according to claim 1, wherein for a majority of said first outer cladding features, the minimum distance b between two nearest neighbouring outer cladding features is smaller than a predetermined wavelength.

13. The cladding pumped optical fibre according to claim 1, wherein for all of said first outer cladding features, the minimum distance b between two nearest neighbouring outer cladding features is smaller than a predetermined wavelength.

14. The cladding pumped optical fibre according to claim 1, wherein the further outer cladding region is made of a homogeneous material.

15. The cladding pumped optical fibre according to claim 1, wherein the largest cross-sectional dimension of the first outer cladding features is equal to or below 10 μm.

16. The cladding pumped optical fibre according to claim 1, wherein the inner cladding comprises a background material and a plurality of features, said features having a refractive index being higher or lower than the refractive index of the background material.

17. The cladding pumped optical fibre according to claim 16, wherein the core comprises one or more dopants for raising or lowering the refractive index above the refractive index of the background material of the inner cladding region.

18. The cladding pumped optical fibre according to claim 1, wherein the outer diameter of the inner cladding region is within the range from 60-400 μm.

19. The cladding pumped optical fibre according to claim 1, wherein the cladding pumped optical fibre has a length with a first end and a second end, and wherein the cross-sectional area of the first outer cladding features in the first end is larger than any cross-sectional area of first outer cladding features in the second end.

20. The cladding pumped optical fibre according to claim 19, wherein the second end comprises no first outer cladding features, or wherein the first outer cladding features are fully collapsed in the second end.

21. The cladding pumped optical fibre according to claim 1, wherein the first outer cladding features are elongate features extending in a fibre axial direction.

22. The cladding pumped optical fibre according to claim 1, wherein said at least one rare earth element is selected from the group of Er, Yb, Nd, La, Ho, Dy or Tm.

23. A method of producing a cladding pumped optical fibre for guiding light as claimed in claim 1, the method comprising:
  (a) providing a preform, said preform comprises:
  (i) at least one center perform element providing a core of the optical fibre, said center preform element comprising at least one element selected from the group consisting of rods, tubes, or combinations thereof;
  (ii) a plurality of inner cladding preform elements for providing an inner cladding region of the cladding pumped optical fibre, said inner cladding perform elements comprising at least one element selected from the group consisting of rods, tubes, or combinations thereof;
  (iii) a plurality of first outer cladding preform elements for providing a first outer cladding region of the optical fibre, said first outer cladding preform elements comprising a plurality of elements selected from the group consisting of rods, tubes, or combinations thereof;
  (iv) a plurality of further outer cladding preform elements for providing at least a second outer cladding region of the optical fibre, said further outer cladding preform elements comprising a plurality of elements selected from the group consisting of rods, tubes, or combinations thereof; and
  (v) an overcladding preform element for providing an outer diameter of the optical fibre, said overcladding preform element comprising an element in form of a tube; and
  (b) drawing said preform into a fibre;
wherein said inner cladding region comprises inner cladding features arranged such that said inner cladding region is suitable for guiding pump light for transfer of energy from cladding modes in said inner cladding to mode(s) of the core, and said first outer cladding preform elements are arranged to provide a minimum distance b between two neighbouring first outer cladding elements of the optical fibre which is smaller 0.6 μm, and wherein said at least one centre preform element is doped with a rare earth element.

24. An article comprising a cladding pumped optical fibre according to claim 1, wherein said article is a cladding pumped fibre laser or amplifier.

25. The article according to claim 24, further comprising a pump radiation source which provides pump light for the cladding pumped optical fibre at a predetermined wavelength.

26. The cladding pumped optical fibre according to claim 1, wherein said plurality of first outer cladding features is arranged in at least one chain surrounding said inner cladding.

* * * * *